(12) United States Patent
Shinohara et al.

(10) Patent No.: US 11,703,661 B2
(45) Date of Patent: Jul. 18, 2023

(54) OPTICAL SYSTEM AND OPTICAL APPARATUS

(71) Applicant: CANON KABUSHIKI KAISHA, Tokyo (JP)

(72) Inventors: Kenji Shinohara, Utsunomiya (JP); Takeo Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 365 days.

(21) Appl. No.: 16/898,983

(22) Filed: Jun. 11, 2020

(65) Prior Publication Data
US 2020/0400919 A1    Dec. 24, 2020

(30) Foreign Application Priority Data

Jun. 19, 2019 (JP) ................. 2019-113311

(51) Int. Cl.
*G02B 9/60* (2006.01)
*G02B 9/62* (2006.01)

(52) U.S. Cl.
CPC ........ *G02B 9/60* (2013.01); *G02B 9/62* (2013.01)

(58) Field of Classification Search
CPC .......... G02B 9/60; G02B 9/62; G02B 13/005
See application file for complete search history.

(56) References Cited

U.S. PATENT DOCUMENTS

| | | |
|---|---|---|
| 9,146,387 B2 | 9/2015 | Shinohara |
| 9,829,681 B2 | 11/2017 | Mori |
| 10,670,832 B2 | 6/2020 | Mori |
| 2016/0187669 A1 | 6/2016 | Suzuki |
| 2019/0149727 A1 | 5/2019 | Mori |

FOREIGN PATENT DOCUMENTS

| | | |
|---|---|---|
| CN | 105739216 A | 7/2016 |
| JP | S61-215513 A | 9/1986 |
| JP | H11-316342 A | 11/1999 |
| JP | 2000-231056 A | 8/2000 |
| JP | 2001-272601 A | 10/2001 |
| JP | 2015215392 A | 12/2015 |

OTHER PUBLICATIONS

Notice of Reasons for Rejection issued by the Japanese Patent Office dated Jan. 31, 2023 in corresponding JP Patent Application No. 2019-113311, with English translation.

*Primary Examiner* — Jack Dinh
(74) *Attorney, Agent, or Firm* — Carter, DeLuca & Farrell LLP

(57) ABSTRACT

An optical system includes, in order from an object side to an image side, a positive first lens unit (L1), a negative second lens unit (L2), a positive third lens unit (L3), and a negative fourth lens unit (L4), wherein distances between adjacent lens units change during focusing, at least the L2 and the L4 move during focusing, the L4 consists of negative and positive partial units, an air distance between the negative and positive partial units is the largest among those between adjacent lenses in the L4, and $0.45 < D4np/D4 < 0.95$ is satisfied, D4 being a distance on an optical axis from a most object-side lens surface to a most image-side lens surface in the L4 and D4np being the air distance between the negative partial unit and the positive partial unit in L4.

11 Claims, 11 Drawing Sheets

OPTICAL SYSTEM AND OPTICAL APPARATUS

BACKGROUND OF THE INVENTION

Field of the Invention

The present invention relates to an image capturing lens and an optical apparatus having the same.

Description of the Related Art

In recent years, high image quality of cameras such as a single-lens reflex camera, a digital still camera, and a video camera using a solid-state image sensor has been improved. In particular, with respect to the single-lens reflex camera, there are increasing demands for a shortest image-capturing distance and an increase in an image-capturing magnification in addition to an improvement in the image quality when an image is captured.

In order to satisfy these demands, in recent years, an image-capturing lens in which a so-called floating focus method for driving a plurality of focus lenses is adopted has been developed. By adopting this method, a focus speed has been increased and an image-capturing magnification has been increased.

In recent years, a development of mirrorless cameras has progressed, and a development of a lens having a relatively short back focus has been also required. As an optical system suitable for this short back focus, a telephoto type power arrangement is known.

On the other hand, as an example corresponding to the short back, an optical system disclosed in, for example, Japanese Patent Laid-Open No. ("JP") 2015-215392 is known. In this image-capturing lens, two focus units are moved to an image side, and an increase in an image-capturing magnification is effectively achieved. However, a recent demand for increasing the image-capturing magnification has not always been sufficiently achieved.

SUMMARY OF THE INVENTION

In order to solve the above problems, the present invention provides a high-performance optical system in which enlargement in the image-capturing magnification is achieved while being compact, and an optical apparatus having the same.

An optical system as one aspect of the present invention includes, in order from an object side to an image side, a first lens unit having a positive refractive power, a second lens unit having a negative refractive power, a third lens unit having a positive refractive power, and a fourth lens unit having a negative refractive power, wherein distances between adjacent lens units change during focusing, wherein at least the second lens unit and the fourth lens unit move during focusing, wherein the fourth lens unit consists of a negative partial unit having a negative refractive power and a positive partial unit having a positive refractive power, wherein an air distance between the negative partial unit and the positive partial unit is the largest among air distances between adjacent lenses in the fourth lens unit, and wherein the conditional expression $0.45 < D4np/D4 < 0.95$ is satisfied, where D4 is a distance on an optical axis from a lens surface closest to the object side to a lens surface closest to the image side in the fourth lens unit, and D4 np is the air distance between the negative partial unit and the positive partial unit in the fourth lens unit.

An optical system as another aspect of the present invention includes, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, wherein distances between adjacent lens units change during focusing, wherein at least the second lens unit and the fourth lens unit move during focusing, wherein the conditional expression $0.45 < Dnp/D45 < 0.95$ is satisfied, where D45 is a distance on an optical axis from a lens surface closest to the object side in the fourth lens unit to a lens surface closest to the image side in the fifth lens unit when focused on at infinity and Dnp is a distance on the optical axis from a lens surface closest to the image side in the fourth lens unit to a lens surface closest to the object side in the fifth lens unit.

An optical apparatus as another aspect of the present invention includes the above optical system and an image sensor configured to receive light of an image formed by the optical system.

Further features of the present invention will become apparent from the following description of exemplary embodiments with reference to the attached drawings.

DESCRIPTION OF THE EMBODIMENTS

Figure 1:
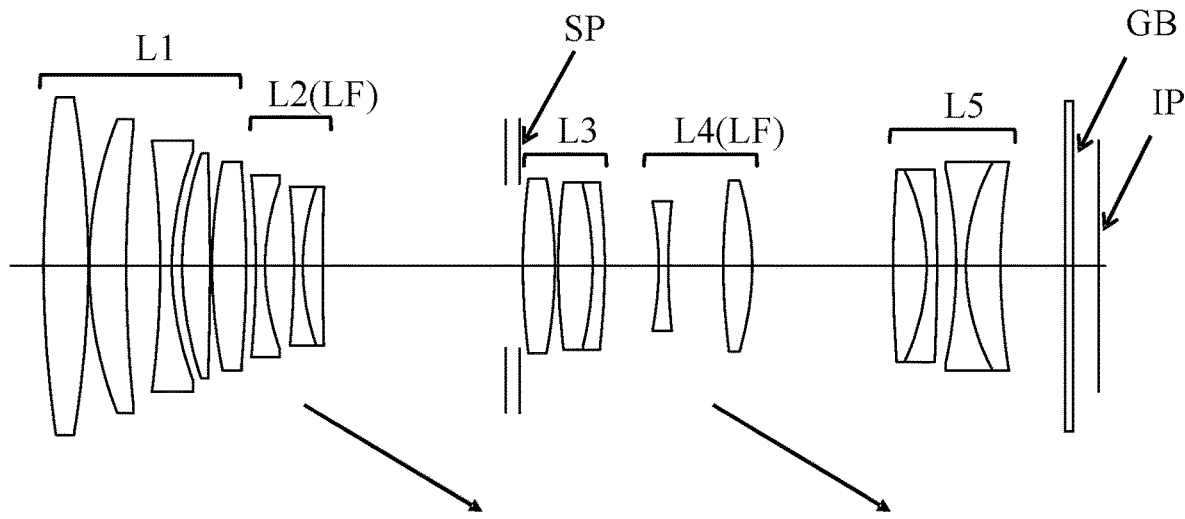
FIG. 1 is a lens cross-sectional view of an image-capturing lens of the first embodiment.

An image-capturing lens (optical system) of each embodiment is characterized in that it is compact and has high-performance, and can increase an image-capturing magnification. In particular, the image-capturing lens (optical system) of each embodiment is suitable for an image-capturing lens used for a single-lens reflex camera, a digital still camera, a film camera, and a video camera, and an image-capturing apparatus having the same. In addition, the image-capturing lens of each embodiment has a relatively short back focus. In order to achieve the short back focus, a telephoto type optical system is advantageous. Therefore, as a lens configuration on an image side in each embodiment, a lens system having a positive refractive power is disposed forward, and a lens system having a negative refractive power is disposed backward.

Also, in order from an object side to the image side, a first lens unit having a positive refractive power, a second lens unit having a negative refractive power, a third lens unit having a positive refractive power, and a fourth lens unit having a negative refractive power are disposed. The negative lens units on the image side of the positive lens units are focus lens units. By using the negative lens units, which have small light beam diameters and small lens diameters on the image side of the positive lens units, as the focus lens units, a focus speed can be increased.

Since an optical system of the short back focus is close to an image sensor, an external diameter of a lens tends to increase. For this reason, a lens unit disposed in front of a final lens unit close to the image sensor is configured to have a negative partial unit and a positive partial unit from the object side, thereby achieving a reduction in a lens diameter of the final lens unit.

On the other hand, with respect to an optical performance, when the image-capturing magnification is increased, various aberrations are also increased. Therefore, it is important to suppress variations of various aberrations during focusing. In each embodiment, a distance between partial units in each focus lens unit is made large, and each partial unit is given an appropriate power, thereby suppressing variations in various aberrations during focusing.

By adopting these configurations, the image-capturing lens of each embodiment realizes enlargement of the image-capturing magnification and high performance while being compact.

Specifically, as a configuration corresponding to the following first to third embodiments, the image-capturing lens is an optical system which includes, in order from the object side to the image side, the first lens unit having a positive refractive power, the second lens unit having a negative refractive power, the third lens unit having a positive refractive power, and the fourth lens unit having a negative refractive power, and where distances between adjacent lens units change during focusing. During focusing, at least the second lens unit and the fourth lens unit move. The fourth lens unit consists of a negative partial unit having a negative refractive power and a positive partial unit having a positive refractive power, and an air distance between the negative partial unit and the positive partial unit is the largest among air distances between adjacent lenses in the fourth lens unit. In the image-capturing lens of each embodiment, the following conditional expression (1) is satisfied $$0.45 < D4np/D4 < 0.95 \qquad (1)$$

where D4 is a distance on an optical axis from a lens surface closest to the object side to a lens surface closest to the image side in the fourth lens unit, and D4 np is the air distance between the negative partial unit and the positive partial unit in the fourth lens unit.

As described above, in each of the first to third embodiments, it is important to suppress variations in various aberrations during focusing by setting the configuration of the focus lens units and setting the appropriate air distance.

The conditional expression (1) is a conditional expression relating to the air distance between a 4a lens unit (negative partial unit) and a 4b lens unit (positive partial unit) disposed in the fourth lens unit and especially relating to correction of spherical aberration and coma aberration. When a lower limit of the conditional expression (1) is exceeded, the air distance is narrowed, which is advantageous in reducing a total lens length. However, it is difficult to suppress spherical aberration and coma aberration during short-distance image capturing. On the other hand, when an upper limit of the conditional expression (1) is exceeded, the air distance is widened, which is advantageous in correcting spherical aberration and coma aberration but is not preferable because the total lens length and a lens diameter of a rear lens unit are increased.

In terms of aberration correction, it is more preferable to set a numerical range of the conditional expression (1) as follows.

$$0.45 < D4np/D4 < 0.90 \qquad (1a)$$

It is more preferable to set a numerical range of the conditional expression (1) as follows.

$$0.45 < D4np/D4 < 0.80 \qquad (1b)$$

Further, it is preferable that the following conditional expression (2) is satisfied $$0.5 < L2/L4 < 2.5 \qquad (2)$$

where L2 and L4 are moving amounts of the second lens unit and the fourth lens unit from infinity to a closest object in focusing, respectively.

The conditional expression (2) is a conditional expression relating to the moving amounts of the second lens unit and the fourth lens unit from the infinity to the closet object in focusing, and particularly relating to a size of the lens. When a lower limit value of the conditional expression (2) is exceeded, the moving amount of the fourth lens unit becomes larger than that of the second lens unit when the image-capturing magnification is increased. Therefore, the total lens length is undesirably increased. On the other hand, when an upper limit of the conditional expression (2) is exceeded, the moving amount of the second lens unit becomes larger than that of the fourth lens unit, which is advantageous for an enlargement of the image-capturing magnification. However, it is difficult to suppress a variation in field curvature.

Further, a rear unit having a negative refractive power as a whole is provided on the image side of the fourth lens unit, and it is preferable that the following conditional expression (3) is satisfied $$1.0 < f4/fR < 15.0 \quad (3)$$

where f4 and fR are focal lengths of the fourth lens unit and the rear unit, respectively.

The conditional expression (3) is a conditional expression relating to a power arrangement of the rear unit disposed closer to the image side than the fourth lens unit, and particularly relating to a lens diameter of the rear unit and correction of spherical aberration and coma aberration of the rear unit. When a lower limit of the conditional expression (3) is exceeded, the focal length of the fourth lens unit becomes short, so that the lens diameter of the rear unit becomes large and it becomes difficult to correct coma aberration. On the other hand, when an upper limit of the conditional expression (3) is exceeded, the focal length of the fourth lens unit becomes large, which is advantageous for aberration correction. However, it is not preferable because the moving amount when enlarging the image-capturing magnification increases and the total lens length increases. In addition, when the focal length of the rear unit is short, an incident angle on the image sensor is large, and influence of color shading is likely to occur, which is not preferable.

Further, it is preferable that the following conditional expression (4) is satisfied $$-25.0 < f4/f1 < -3.0 \quad (4)$$

where f1 is a focal length of the first lens unit.

The conditional expression (4) is a conditional expression relating to a power arrangement of the first lens unit and the fourth lens unit, and particularly relating to spherical aberration and axial chromatic aberration. When a lower limit of the conditional expression (4) is exceeded, the focal length of the first lens unit becomes short, which makes it difficult to correct spherical aberration and axial chromatic aberration. On the other hand, when an upper limit of the conditional expression (4) is exceeded, the focal length of the fourth lens unit becomes short, which is advantageous in shortening the total lens length. However, it is not preferable because the lens diameter of the rear unit becomes large.

Further, it is preferable that the following conditional expression (5) is satisfied $$6.0 < f4/f2 < 35.0 \quad (5)$$

where f2 is a focal length of the second lens unit.

The conditional expression (5) is a conditional expression relating to a power arrangement of the second lens unit and the fourth lens unit, and particularly relating to aberration variation during focusing. When a lower limit of the conditional expression (5) is exceeded, the focal length of the fourth lens unit becomes short, which makes it difficult to suppress coma aberration variation during focusing. On the other hand, when an upper limit of the conditional expression (5) is exceeded, the focal length of the second lens unit becomes short, which makes it difficult to suppress field curvature variation during focusing.

In terms of aberration correction, it is more preferable to set numerical ranges of the conditional expressions (2) to (5) as follows.

$$0.55 < L2/L4 < 2.4 \quad (2a)$$

$$1.5 < f4/fR < 14.0 \quad (3a)$$

$$-23.0 < f4/f1 < -3.5 \quad (4a)$$

$$6.5 < f4/f2 < 33.0 \quad (5a)$$

Further, it is more preferable to set numerical ranges of the conditional expressions (2) to (5) as follows.

$$0.6 < L2/L4 < 2.3 \quad (2b)$$

$$2.0 < f4/fR < 12.0 \quad (3b)$$

$$-20.0 < f4/f1 < -4.0 \quad (4b)$$

$$7.0 < f4/f2 < 31.0 \quad (5b)$$

As a configuration corresponding to the following fourth and fifth embodiments, the image-capturing lens is an optical system which includes, in order from the object side to the image side, the first lens unit having a positive refractive power, the second lens unit having a negative refractive power, the third lens unit having a positive refractive power, the fourth lens unit having a negative refractive power, and a fifth lens unit having a positive refractive power, and where distances between adjacent lens units change during focusing. During focusing, at least the second lens unit, the fourth lens unit, and the fifth lens unit move. The following conditional expression (6) is satisfied $$0.45 < Dnp/D45 < 0.95 \quad (6)$$

where D45 is a distance on the optical axis from a lens surface closest to the object side in the fourth lens unit to a lens surface closest to the image side in the fifth lens unit when focused on at infinity, and Dnp is a distance on the optical axis from a lens surface closest to the image side in the fourth lens unit to a lens surface closest to the object side in the fifth lens unit.

The conditional expression (6) is a conditional expression relating to an air distance between the fourth lens unit and the fifth lens unit, and particularly relating to correction of spherical aberration and coma aberration. When a lower limit of the conditional expression (6) is exceeded, the air distance is reduced, which is advantageous in reducing the total lens length. However, it is difficult to suppress spherical aberration and coma aberration during short-distance image capturing. On the other hand, when an upper limit of the conditional expression (6) is exceeded, the air distance is widened, which is advantageous in correcting spherical aberration and coma aberration, but it is not preferable because the total lens length and the lens diameter of the rear lens unit are increased.

In terms of aberration correction, it is preferable to set a numerical range of the conditional expression (6) as follows.

$$0.45 < Dnp/D45 < 0.90 \quad (6a)$$

It is more preferable to set a numerical range of the conditional expression (6) as follows.

$$0.45 < Dnp/D45 < 0.80 \quad (6b)$$

It is preferable that the following conditional expression (7) is satisfied $$1.0 \leq L4/L5 < 4.0 \quad (7)$$

where, as described above, L4 and L5 are moving amounts of the fourth lens unit and the fifth lens unit from the infinity to the closest object in focusing, respectively.

The conditional expression (7) is a conditional expression relating to moving amounts of the fourth lens unit and the fifth lens unit from the infinity to the closest object in focusing, and particularly relating to variations in spherical aberration and coma aberration during focusing. When a lower limit of the conditional expression (7) is exceeded, the moving amount of the fifth lens unit is larger than that of the fourth lens unit, so that although it is not necessary to secure a distance between the units, it is difficult to increase the image-capturing magnification. Further, a lens diameter on the image side of the fifth lens unit becomes large, which is not preferable. On the other hand, when an upper limit of the conditional expression (7) is exceeded, the moving amount of the fourth lens unit is larger than that of the fifth lens unit, which is advantageous in correcting spherical aberration and coma aberration during focusing. However, it is necessary to secure the distance between them, which is not preferable because the lens becomes large.

It is preferable that the following conditional expression (8) is satisfied $$0.5 < L2/L4 < 2.5 \tag{8}$$

where L2 and L4 are moving amounts of the second lens unit and the fourth lens unit from the infinity to the closest object in focusing, respectively.

The conditional expression (8) is a conditional expression relating to the moving amounts of the second lens unit and the fourth lens unit from the infinity to the closet object in focusing, and particularly relating to a size of the lens. When a lower limit value of the conditional expression (8) is exceeded, the moving amount of the fourth lens unit becomes larger than that of the second lens unit when the image-capturing magnification is increased. Therefore, the total lens length is undesirably increased. On the other hand, when an upper limit of the conditional expression (8) is exceeded, the moving amount of the second lens unit becomes larger than that of the fourth lens unit, which is advantageous for an enlargement of the image-capturing magnification. However, it is difficult to suppress a variation in field curvature.

As described above, a rear unit having a negative refractive power as a whole is provided on the image side of the fifth lens unit, and it is preferable that the following conditional expression (9) is satisfied $$1.0 < f45/fR < 15.0 \tag{9}$$

where f45 and fR are a composite focal length of the fourth lens unit and the fifth lens unit and a focal length of the rear unit, respectively.

The conditional expression (9) is a conditional expression relating to a power arrangement of the rear unit disposed closer to the image side than the fifth lens unit, and particularly relating to a lens diameter of the rear unit and correction of spherical aberration and coma aberration of the rear unit. When a lower limit of the conditional expression (9) is exceeded, the composite focal length of the fourth lens unit and the fifth lens unit becomes short, so that the lens diameter of the rear unit becomes large and it becomes difficult to correct coma aberration. On the other hand, when an upper limit of the conditional expression (9) is exceeded, the composite focal length of the fourth lens unit and the fifth lens unit becomes large, which is advantageous for aberration correction. However, it is not preferable because the moving amount when the image-capturing magnification is enlarged increases and the total lens length increases. In addition, when the focal length of the rear unit is short, an incident angle on the image sensor is large, and influence of color shading is likely to occur, which is not preferable.

It is preferable that the following expression (10) is satisfied $$-25.0 < f45/f1 < -3.0 \tag{10}$$

where f1 is, as described above, the focal length of the first lens unit.

The conditional expression (10) is a conditional expression relating to a power arrangement of the first lens unit and a composition of the fourth lens unit and the fifth lens unit, and particularly relating to spherical aberration and axial chromatic aberration. When a lower limit of the conditional expression (10) is exceeded, the focal length of the first lens unit becomes short, which makes it difficult to correct spherical aberration and axial chromatic aberration. On the other hand, when an upper limit of the conditional expression (10) is exceeded, the composite focal length of the fourth lens unit and the fifth lens unit becomes short, which is advantageous in shortening the total lens length. However, it is not preferable because the lens diameter of the rear unit becomes large.

It is preferable that the following conditional expression (11) is satisfied $$6.0 < f45/f2 < 35.0 \tag{11}$$

where f2 is, as described above, the focal length of the second lens unit.

The conditional expression (11) is a conditional expression relating to a power arrangement of the second lens unit and a composition of the fourth lens unit and the fifth lens unit, and particularly relating to aberration variation during focusing. When a lower limit of the conditional expression (11) is exceeded, the composite focal length of the fourth lens unit and the fifth lens unit becomes short, which makes it difficult to suppress coma aberration variation during focusing. On the other hand, when an upper limit of the conditional expression (11) is exceeded, the focal length of the second lens unit becomes short, which makes it difficult to suppress field curvature variation during focusing.

In terms of aberration correction, it is more preferable to set numerical ranges of the conditional expressions (7) to (11) as follows.

$$1.2 < L4/L5 < 3.8 \tag{7a}$$

$$0.55 < L2/L4 < 2.4 \tag{8a}$$

$$1.5 < f45/fR < 14.0 \tag{9a}$$

$$-23.0 < f45/f1 < -3.5 \tag{10a}$$

$$6.5 < f45/f2 < 33.0 \tag{11a}$$

Further, it is more preferable to set numerical ranges of the conditional expressions (7) to (11) as follows.

$$1.5 < L4/L5 < 3.5 \tag{7b}$$

$$0.6 < L2/L4 < 2.3 \tag{8b}$$

$$2.0 < f45/fR < 12.0 \tag{9b}$$

$$-20.0 < f45/f1 < -4.0 \tag{10b}$$

$$7.0 < f45/f2 < 31.0 \tag{11b}$$

By configuring each lens unit as described above in each embodiment, a high-performance optical system in which enlargement in the image-capturing magnification is achieved while being compact, and an optical apparatus having the same are provided.

Hereinafter, embodiments of the present invention will be described with reference to the accompanying drawings. In the drawings, the same reference numerals indicate the same members.

First Embodiment

FIGS. 1 and 2-4 are a lens cross-sectional view and aberration diagrams of the image-capturing lens of the first embodiment at infinity, respectively.

In FIG. 1, a left side is the object side, and a right side is the image side (The same applies to lens cross-sectional views of the other embodiments.). In the lens cross-sectional view of FIG. 1, L1 is the first lens unit having a positive refractive power, L2 is the second lens unit having a negative refractive power, L3 is the third lens unit having a positive refractive power, L4 is the negative lens unit having a negative refractive power, and L5 is the fifth lens unit having a negative refractive power. The second lens unit L2 and the fourth lens unit L4 correspond to focus lens units LF that move during focusing. The lens units other than the second lens unit L2 and the fourth lens unit L4 do not move during focusing. SP denotes an aperture stop, which is disposed on the object side of the third lens unit L3, and is fixed during focusing. IP denotes an image plane, which corresponds to an image-capturing surface of a solid-state image sensor such as a CCD sensor and a CMOS sensor in a digital still camera or a video camera, and a film surface in a silver halide film camera. GB denotes a glass block and corresponds to a low-pass filter or an IR cut filter.

Figure 2:
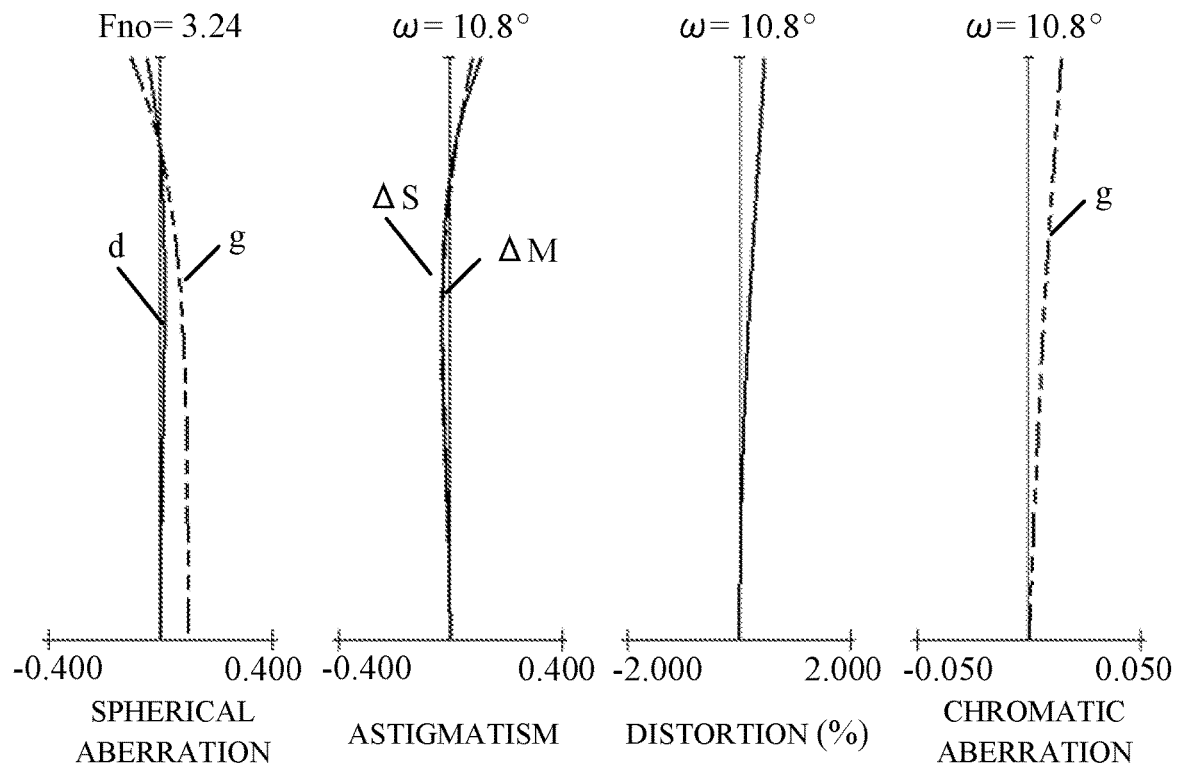
FIG. 2 is an aberration diagram of the image-capturing lens of the first embodiment at infinity.
Figure 3:
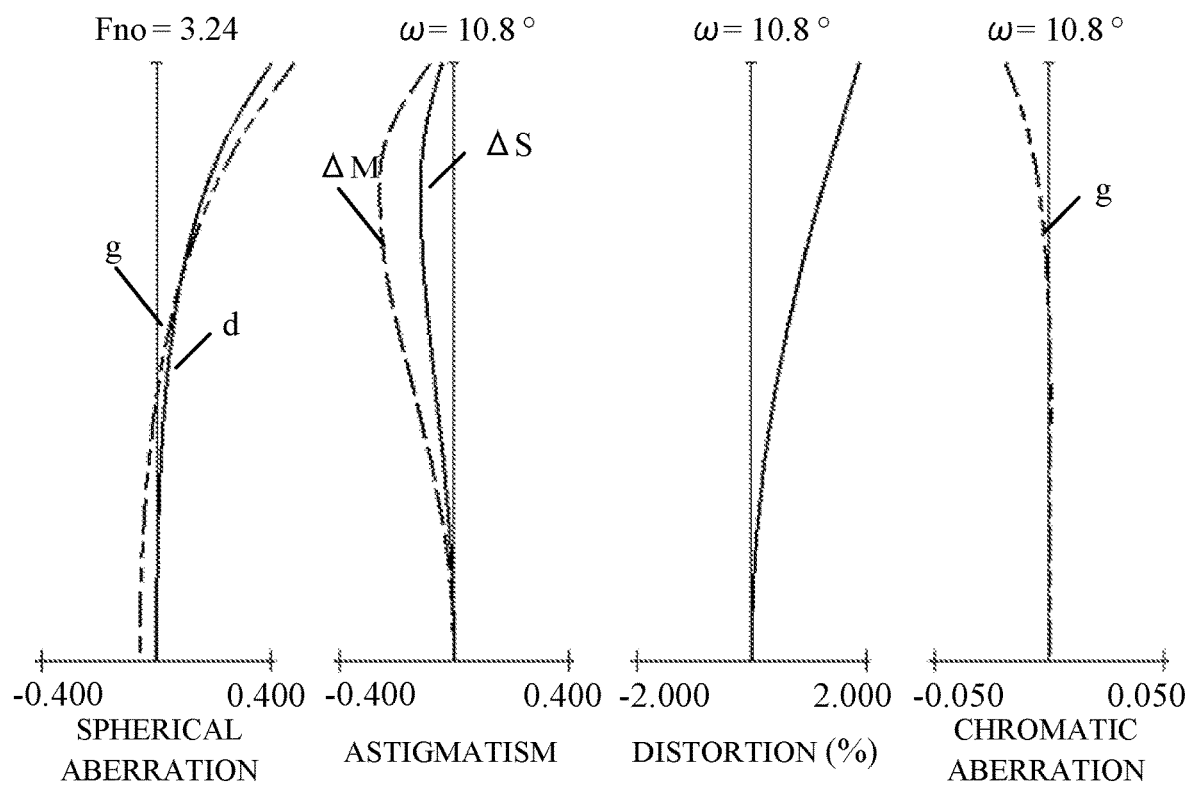
FIG. 3 is an aberration diagram of the image-capturing lens of the first embodiment at an image-capturing magnification of 0.5.
Figure 4:
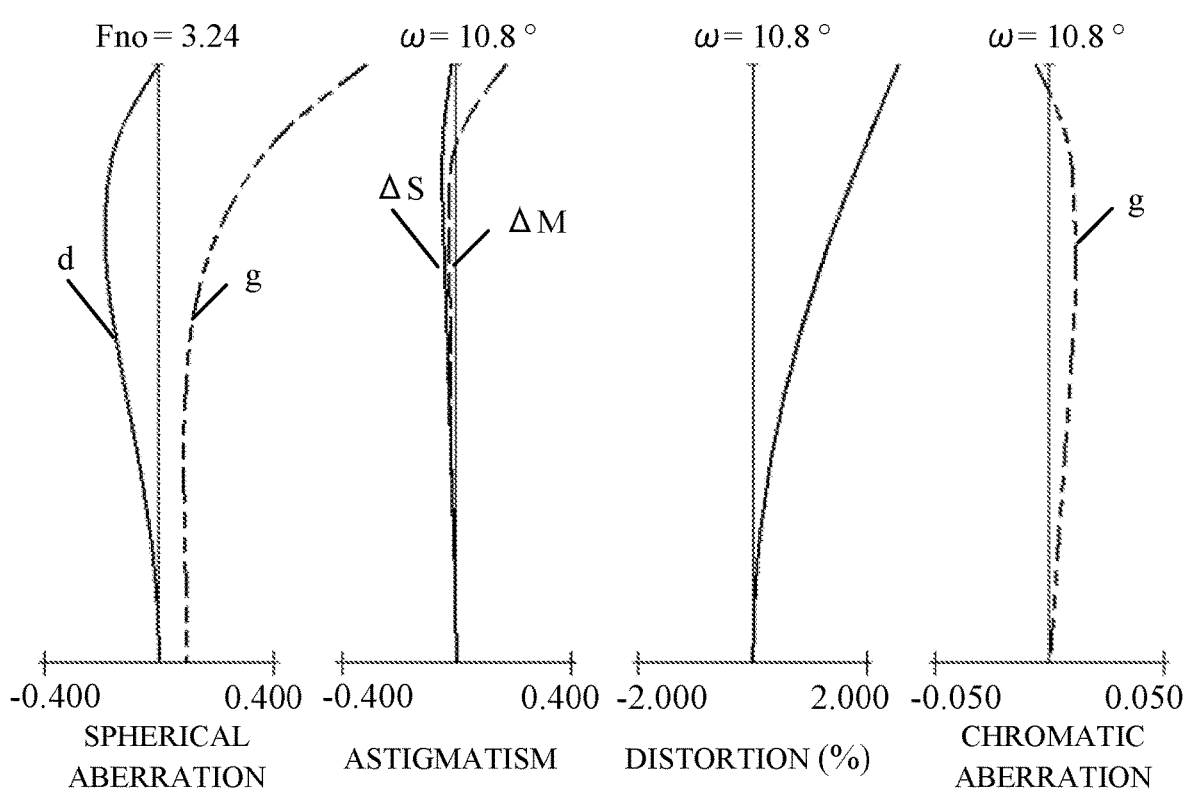
FIG. 4 is an aberration diagram of the image-capturing lens of the first embodiment at the image-capturing magnification of 1.0.

In each aberration diagram in FIGS. 2-4, d and g represent a d-line and a g-line, respectively, and ΔM and ΔS represent a meridional image plane and a sagittal image plane, respectively. A lateral chromatic aberration is represented by the g-line. Fno is an F number, and ω is a half angle of view (°).

Next, a lens configuration of each lens unit will be described. The first lens unit L1 is configured by a positive lens having both convex surfaces and a positive lens having an object-side convex surface, a negative lens having both concave surfaces, a positive lens having both convex surfaces, and a positive lens having both convex surfaces. In the optical system of this embodiment, a refractive power of the first lens unit L1 is increased within an appropriate range in order to reduce the size. Then, various aberrations, particularly spherical aberration and axial chromatic aberration, are generated in the first lens unit L1. Therefore, by disposing many positive lenses and dispersing the refractive power, the spherical aberration generated in the first lens unit L1 is suppressed. By using a low-dispersion glass material for the positive lenses and a high-dispersion glass material for the negative lens, an occurrence of the chromatic aberration is suppressed.

The second lens unit L2 is configured by a negative lens having both concave surfaces, and a cemented lens composed of a negative lens having both concave surfaces and a positive lens having an object-side convex surface. In the optical system of this embodiment, a refractive power of the second lens unit L2 is increased within an appropriate range in order to suppress a moving amount during focusing. In this embodiment, the number of concave lenses is two and the refractive power is dispersed to suppress field curvature. In addition, chromatic aberration is reduced over the entire focus range by disposing the cemented lens. Further, by using a glass material having a high refractive index, a Petzval sum is suppressed, and a variation of coma aberration due to focusing is suppressed.

The third lens unit L3 is configured by a positive lens having both convex surfaces, and a cemented lens composed of a positive lens having both convex surfaces and a negative lens having an object-side concave surface. In the optical system of this embodiment, a refractive power of the third lens unit L3 is increased within an appropriate range in order to reduce the size of the fourth lens unit. Then, various aberrations, particularly spherical aberration and axial chromatic aberration, are generated in the third lens unit L3. Therefore, by dispersing the refractive power between the two positive lenses, the spherical aberration is suppressed. In addition, by disposing the cemented lens, an occurrence of the axial chromatic aberration is suppressed.

The fourth lens unit L4 is configured by a negative lens having both concave surfaces, and a positive lens having both convex surfaces. Each of these two lenses constituting the fourth lens unit L4 may be a lens unit consisting of a plurality of lenses. In the optical system of this embodiment, a refractive power of the fourth lens unit L4 is increased within an appropriate range in order to suppress moving amount during focusing. Then, various aberrations, particularly coma aberration, are generated in the fourth lens unit L4. Therefore, by maximizing an air distance between the two lenses constituting the fourth lens unit L4 among air distances between adjacent lenses in the fourth lens unit L4, a correction of the coma aberration and a correction of the spherical aberration are both achieved.

The fifth lens unit L5 is configured by, in order from the object side to the image side, a cemented lens composed of a positive lens and a negative lens, and a cemented lens composed of a negative lens and a positive lens. In the optical system of this embodiment, a refractive power of the fifth lens unit L5 is increased within an appropriate range in order to achieve the short back. Then, various aberrations, particularly lateral chromatic aberration, are generated in the fifth lens unit L5. Therefore, by disposing the plurality of cemented lenses, an occurrence of the lateral chromatic aberration is suppressed.

In this embodiment, the second lens unit L2 and the fourth lens unit L4 are moved to the image side as indicated by arrows in focusing from infinity to a close distance. During focusing, the first lens unit L1 is fixed, but may be operated for aberration correction.

Further, at the time of image capturing, the whole or a part of the third lens unit L3 may be moved in a direction orthogonal to the optical axis in order to correct a blur caused by a shift of the image plane of an object image. The term "orthogonal" here means not a vertical in a strict sense but a deviation that can be regarded as vertical.

Second Embodiment

FIGS. 5 and 6-8 are a lens cross-sectional view and aberration diagrams of the image-capturing lens of the second embodiment at infinity, respectively.

Figure 5:
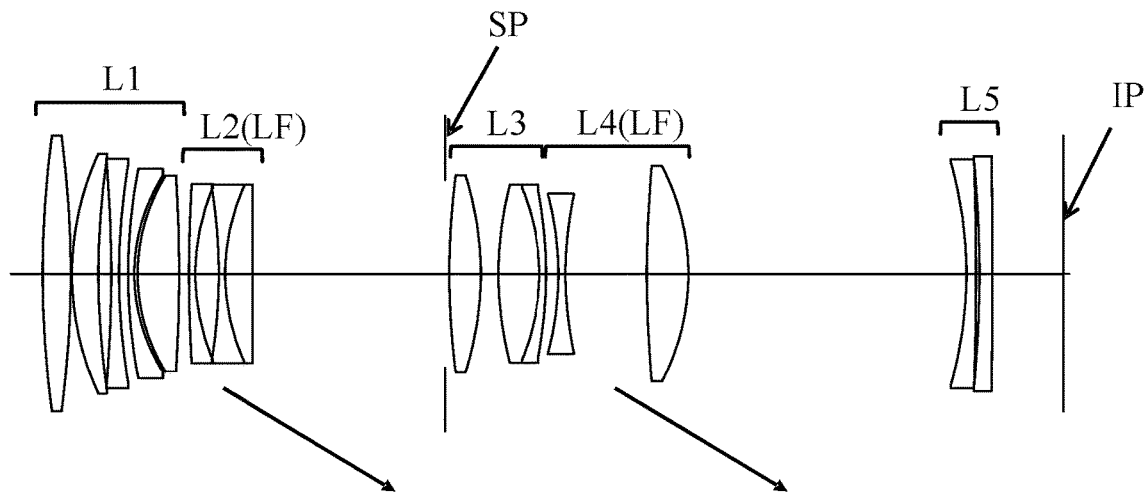
FIG. 5 is a lens cross-sectional view of an image-capturing lens of the second embodiment.
Figure 6:
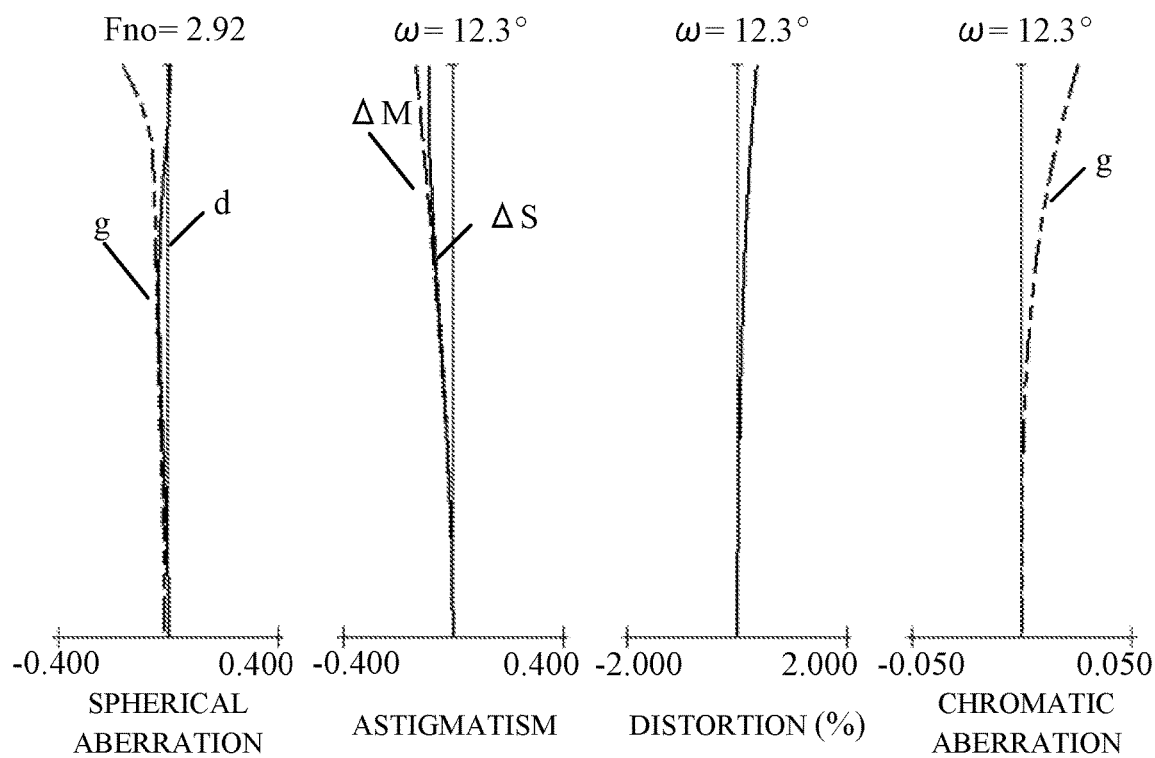
FIG. 6 is an aberration diagram of the image-capturing lens of the second embodiment at infinity.
Figure 7:
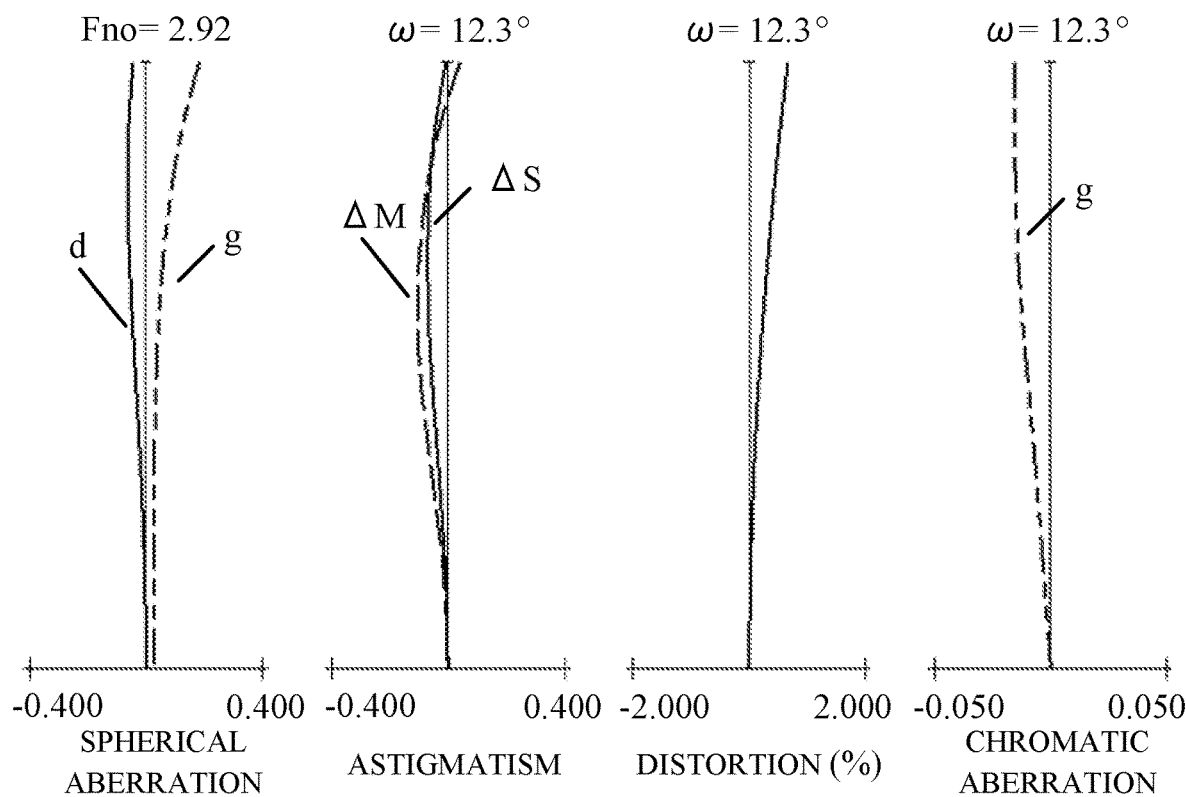
FIG. 7 is an aberration diagram of the image-capturing lens of the second embodiment at an image-capturing magnification of 0.5.
Figure 8:
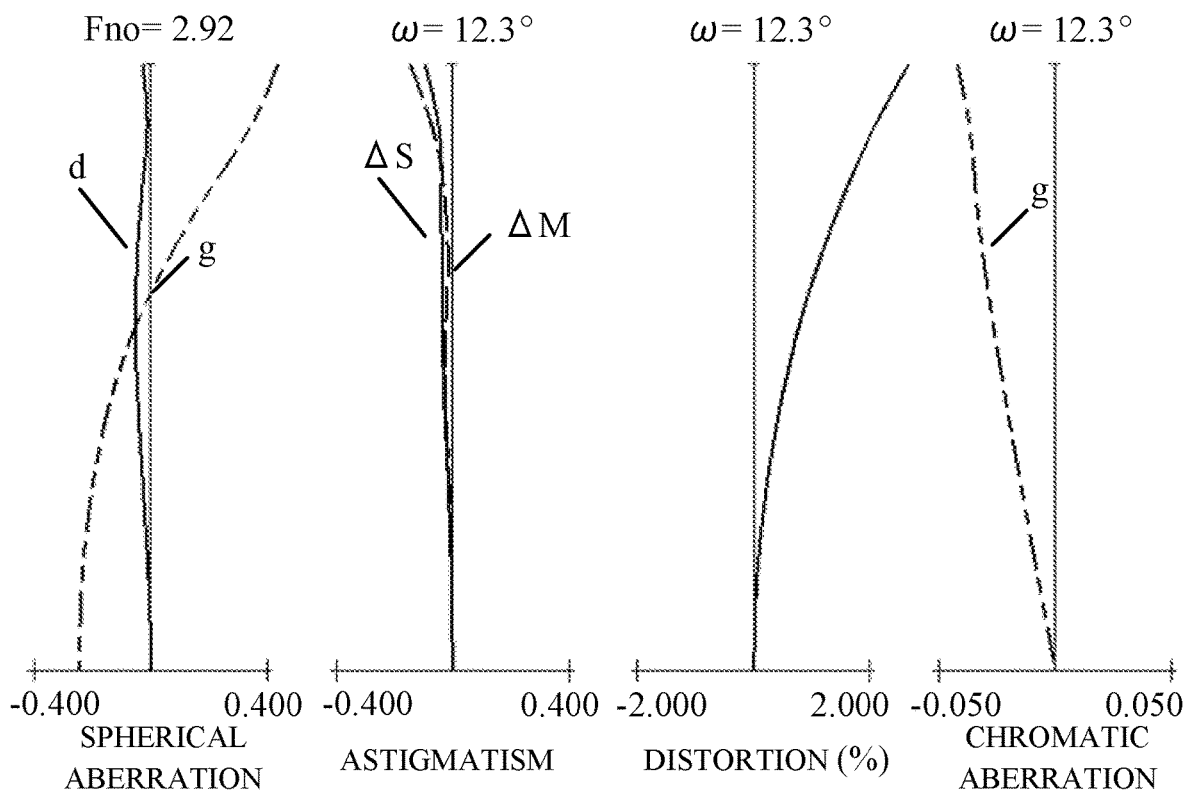
FIG. 8 is an aberration diagram of the image-capturing lens of the second embodiment at an image-capturing magnification of 1.5.

The main difference from the first embodiment is that in the lens cross-sectional view of FIG. 5, the fifth lens unit L5 is configured by a negative lens and a negative lens in order from the object side to the image side.

Except for the above, the description is the same as that of the first embodiment.

Third Embodiment

FIGS. 9 and 10-12 are a lens cross-sectional view and aberration diagrams of the image-capturing lens of the third embodiment at infinity, respectively.

Figure 9:
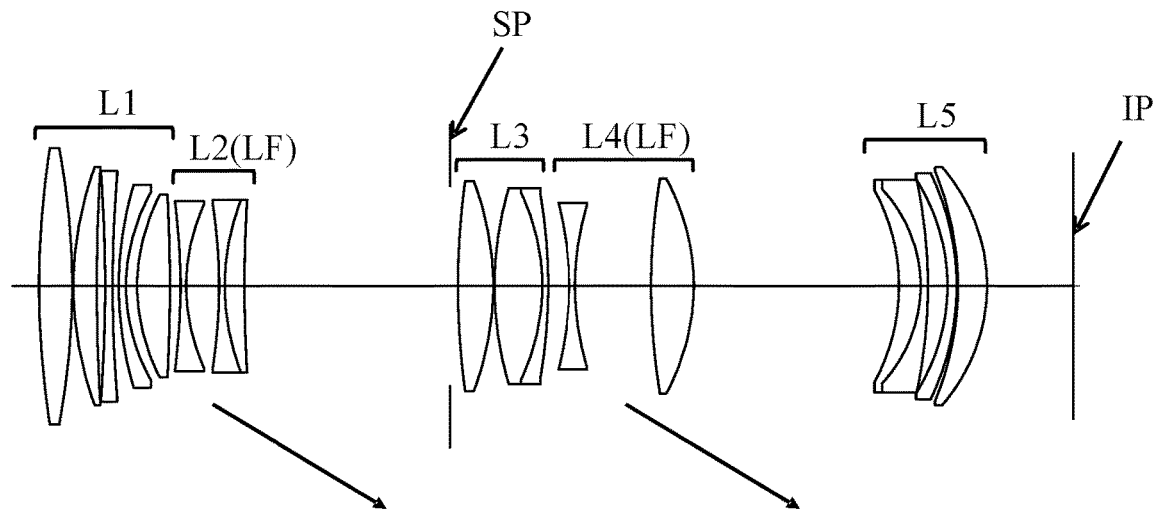
FIG. 9 is a lens cross-sectional view of an image-capturing lens of the third embodiment.
Figure 10:
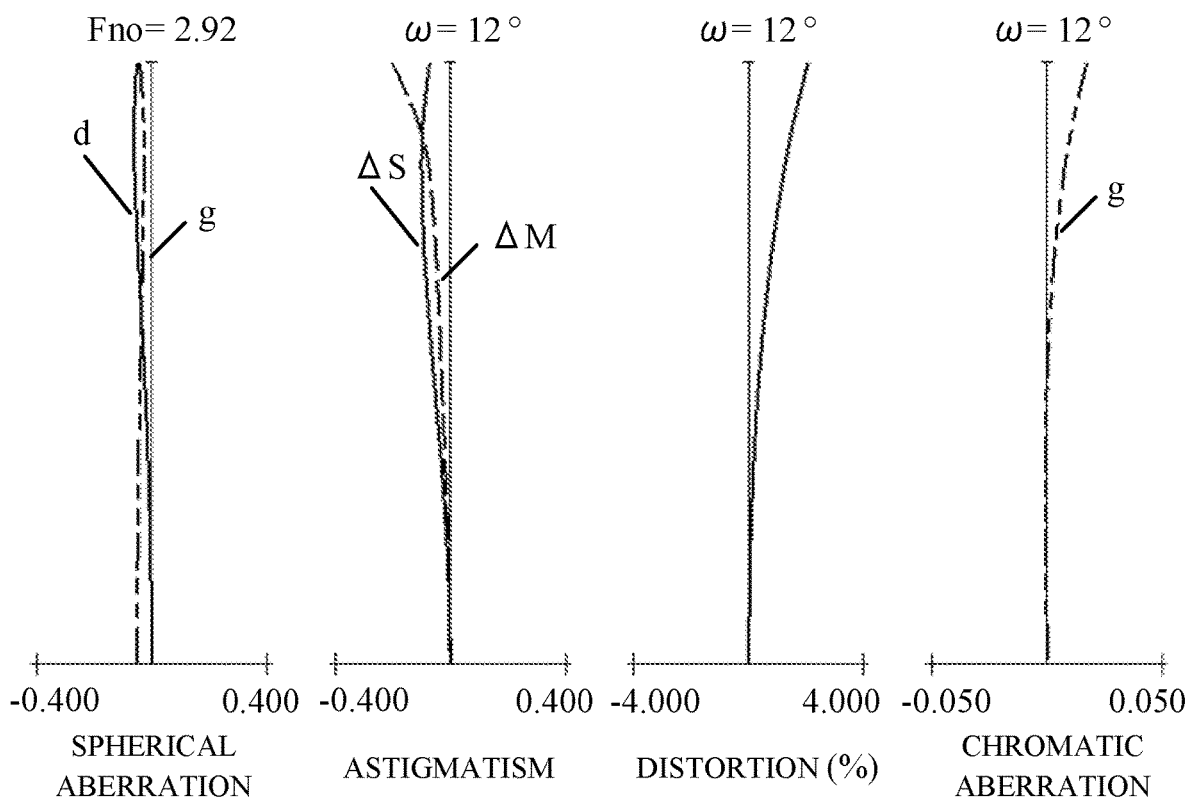
FIG. 10 is an aberration diagram of the image-capturing lens of the third embodiment at infinity.
Figure 11:
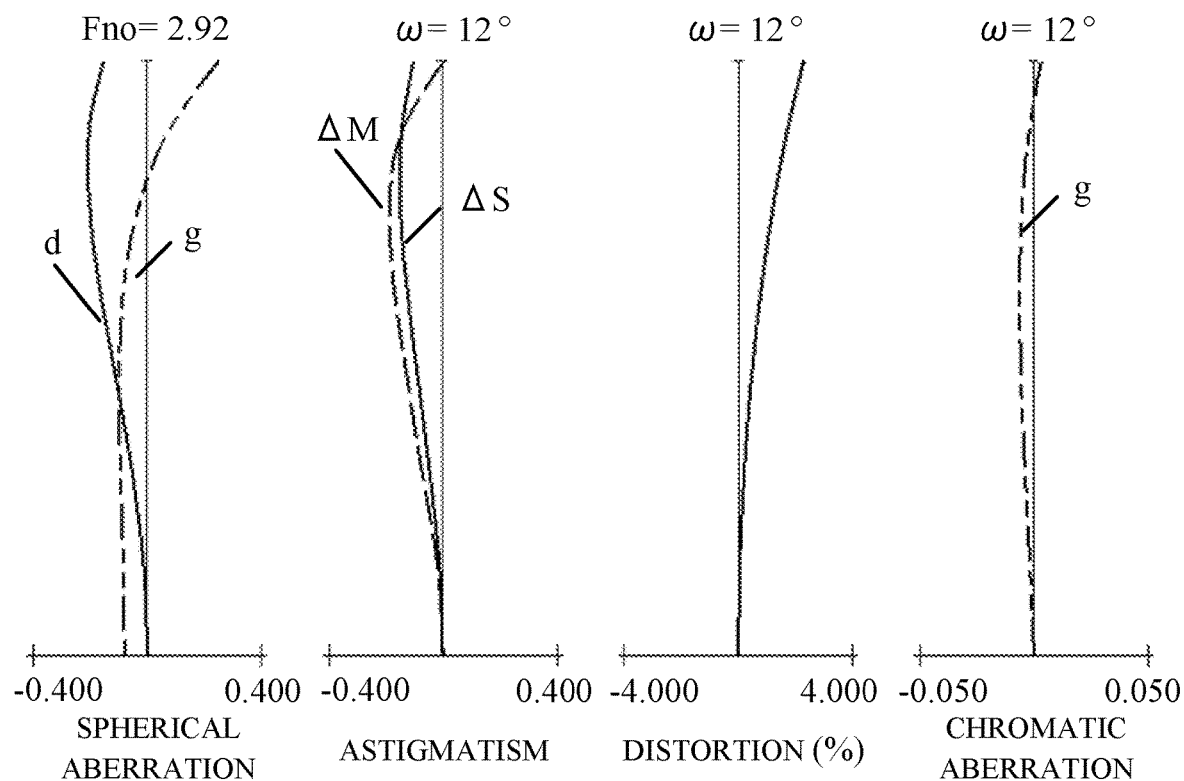
FIG. 11 is an aberration diagram of the image-capturing lens of the third embodiment at the image-capturing magnification of 1.0.
Figure 12:
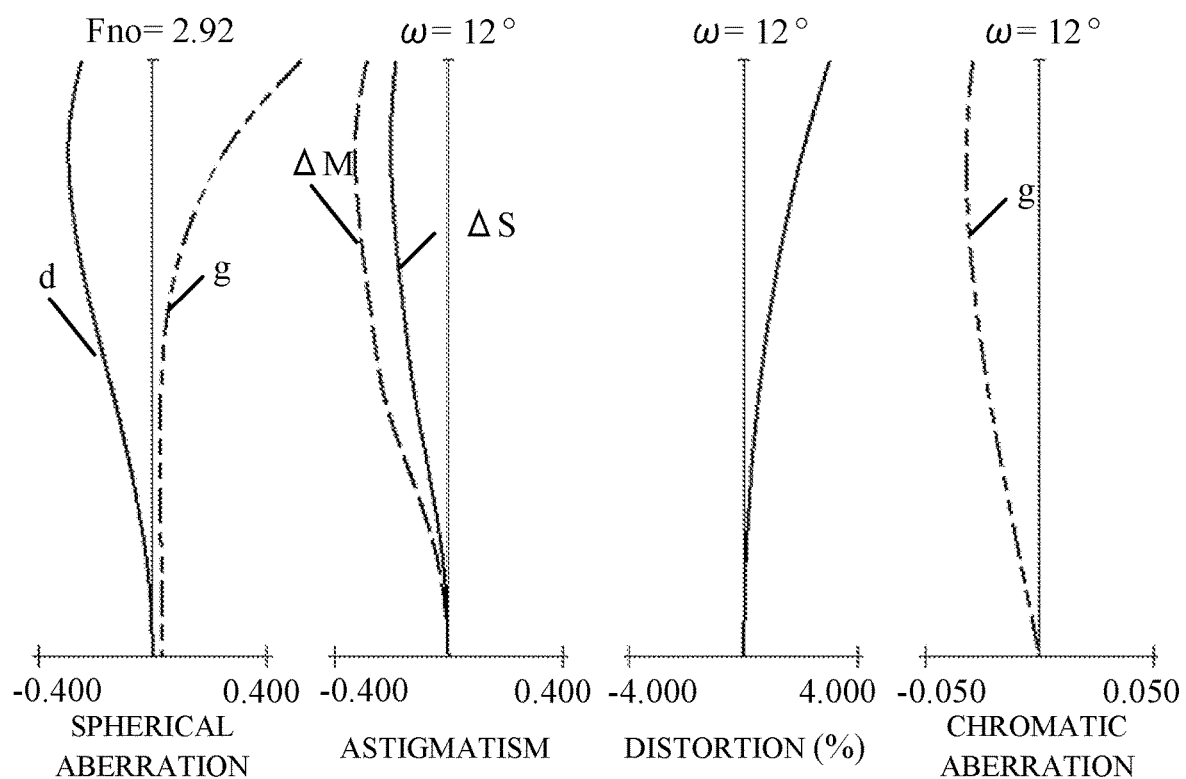
FIG. 12 is an aberration diagram of the image-capturing lens of the third embodiment at the image-capturing magnification of 2.0.

The main difference from the first embodiment is that in the lens cross-sectional view of FIG. 9, the fifth lens unit L5 is configured by a cemented lens composed of a positive lens and a negative lens, a negative lens, and a positive lens in order from the object side to the image side.

Except for the above, the description is the same as that of the first embodiment.

Fourth Embodiment

FIGS. 13 and 14-16 are a lens cross-sectional view and aberration diagrams of the image-capturing lens of the fourth embodiment at infinity, respectively.

Figure 13:
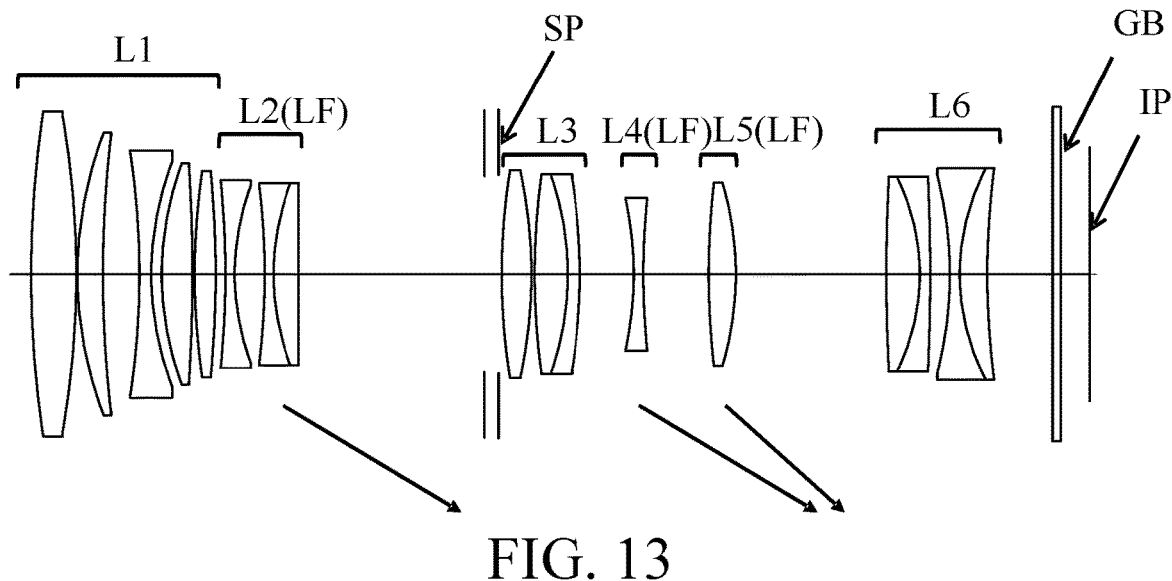
FIG. 13 is a lens cross-sectional view of an image-capturing lens of the fourth embodiment.
Figure 14:
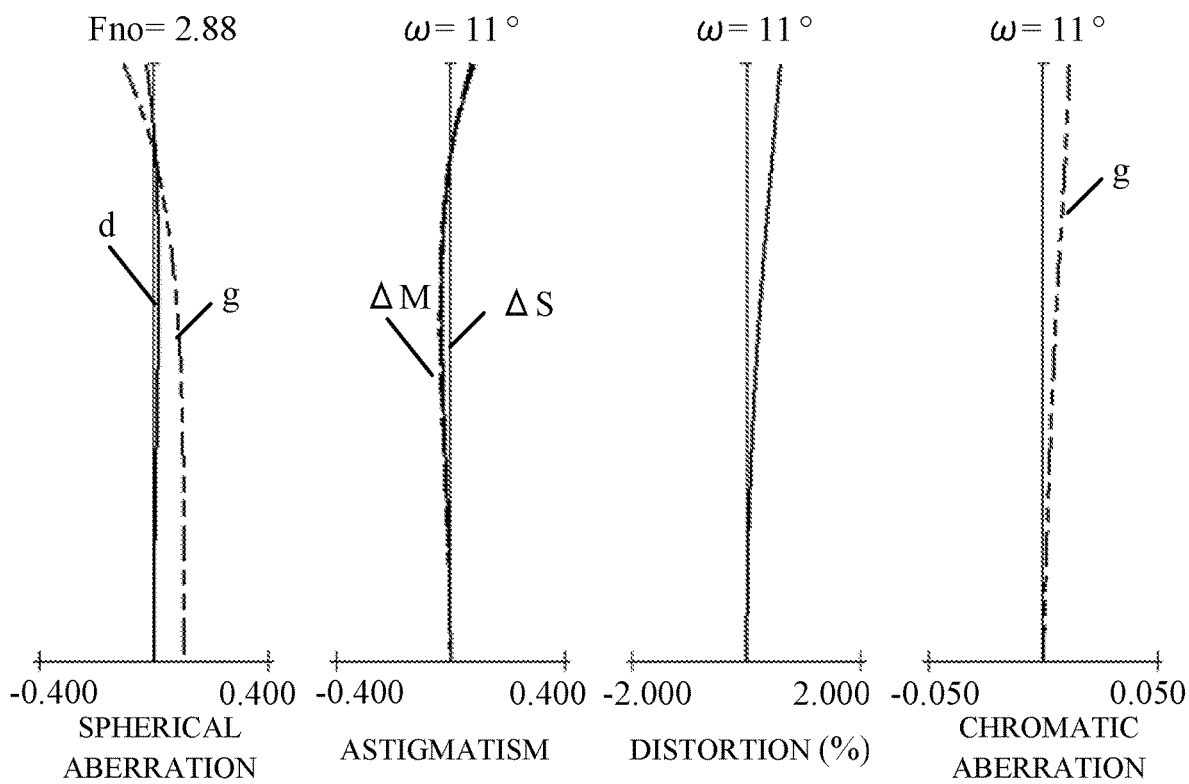
FIG. 14 is an aberration diagram of the image-capturing lens of the fourth embodiment at infinity.
Figure 15:
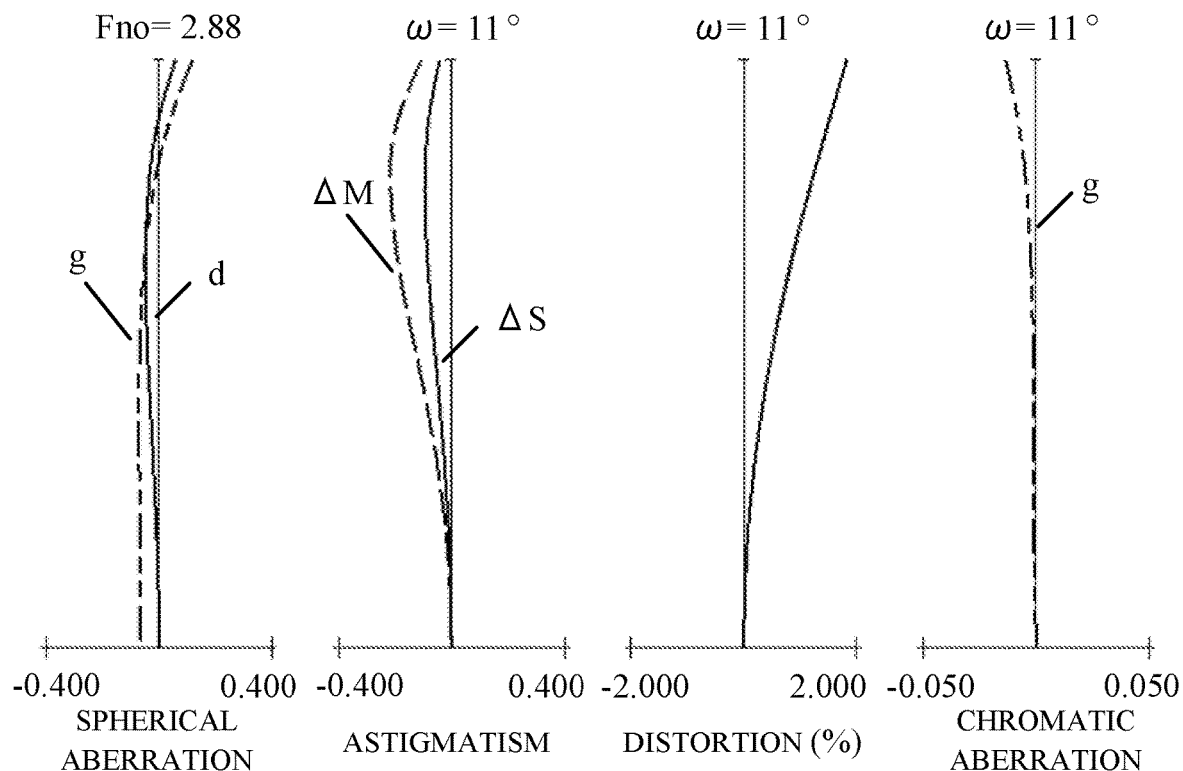
FIG. 15 is an aberration diagram of the image-capturing lens of the fourth embodiment at the image-capturing magnification of 0.5.
Figure 16:
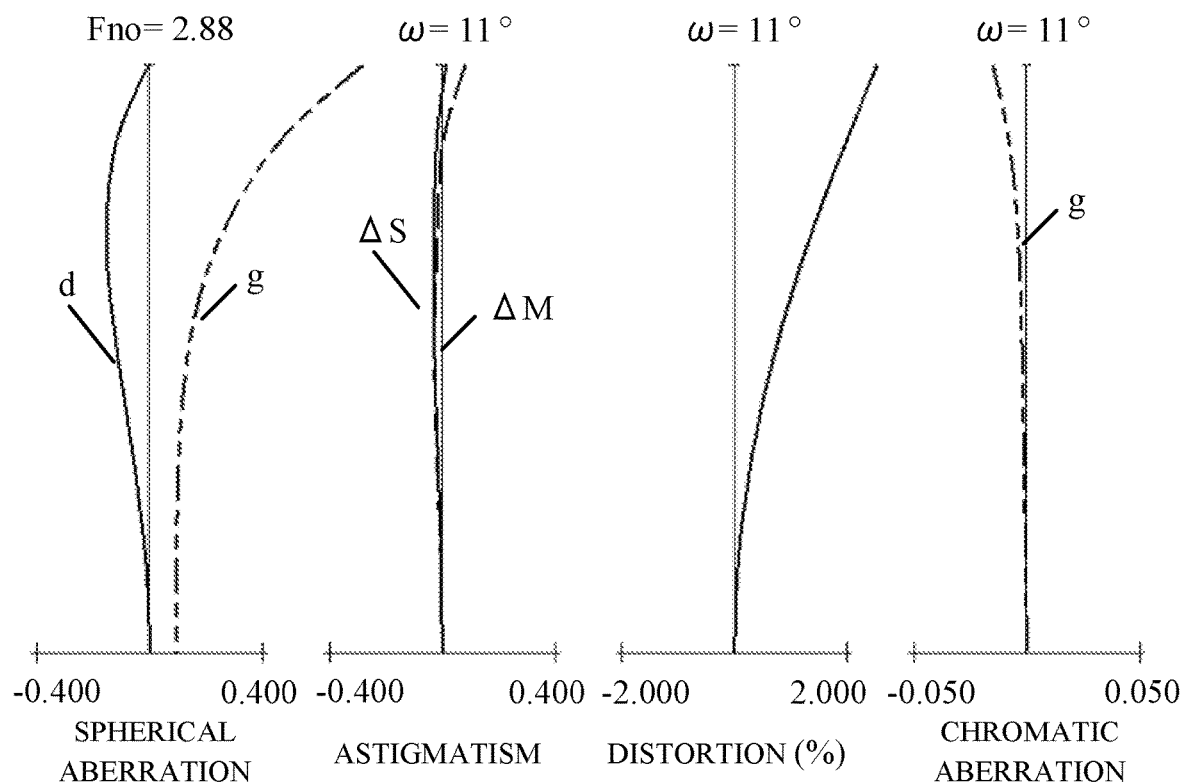
FIG. 16 is an aberration diagram of the image-capturing lens of the fourth embodiment at the image-capturing magnification of 1.0.
Figure 17:
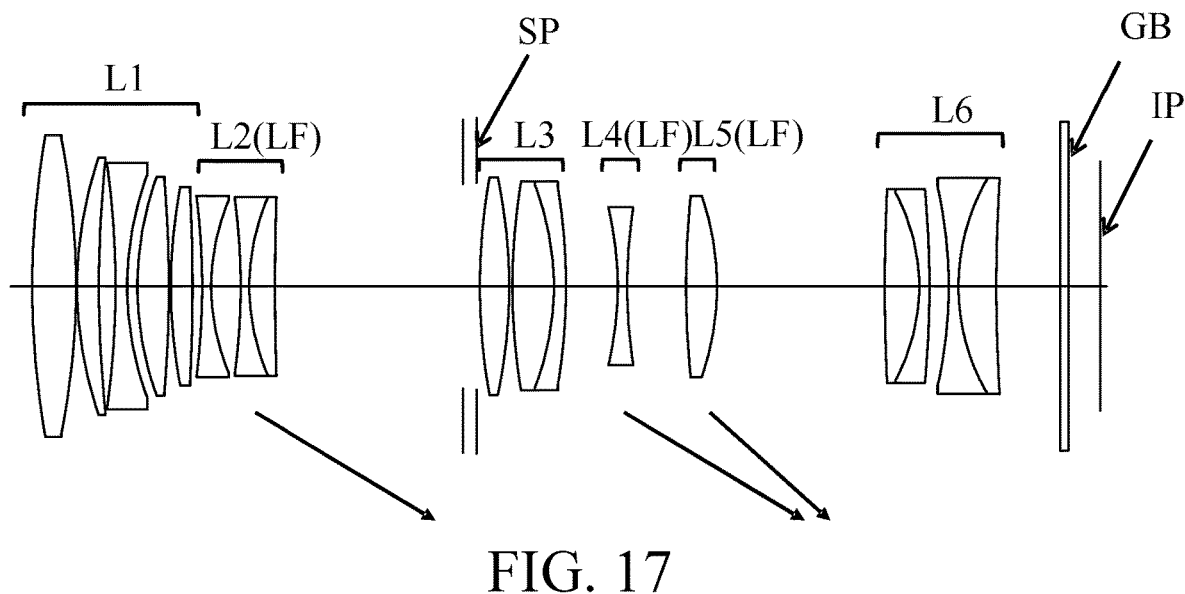
FIG. 17 is a lens cross-sectional view of an image-capturing lens of the fifth embodiment.
Figure 18:
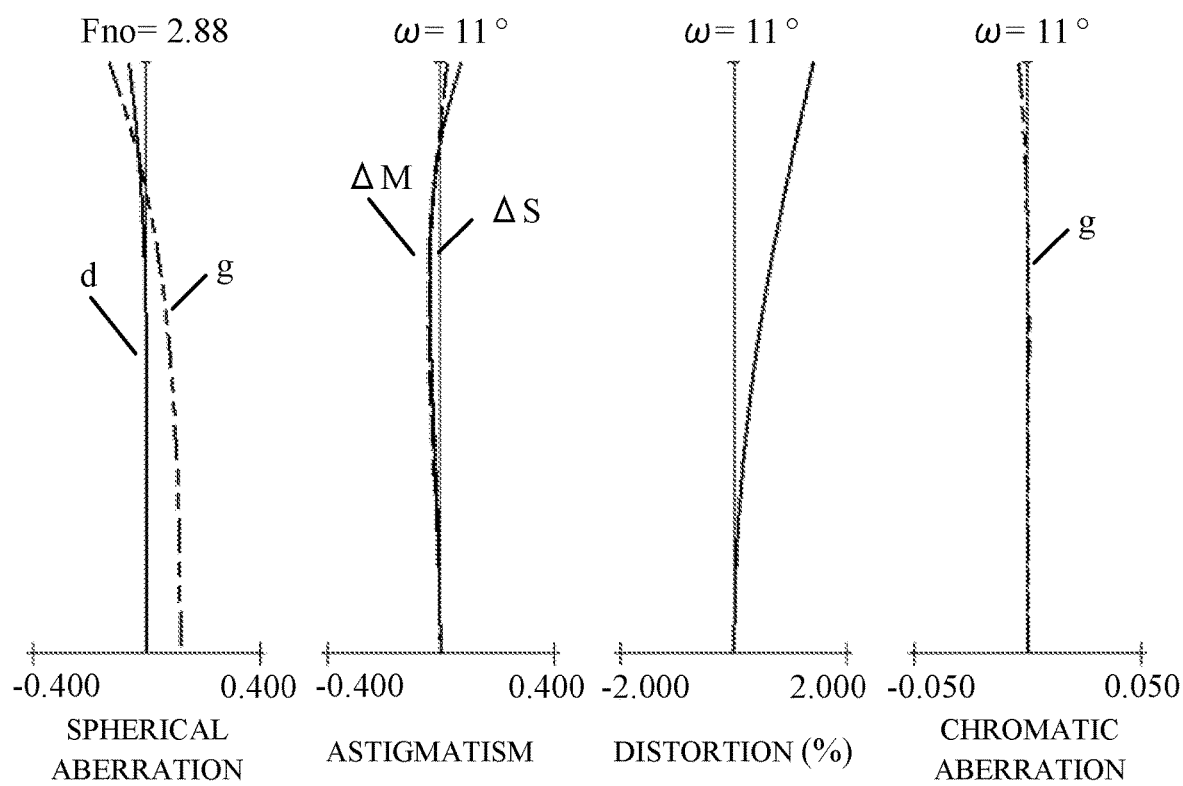
FIG. 18 is an aberration diagram of the image-capturing lens of the fifth embodiment at infinity.
Figure 19:
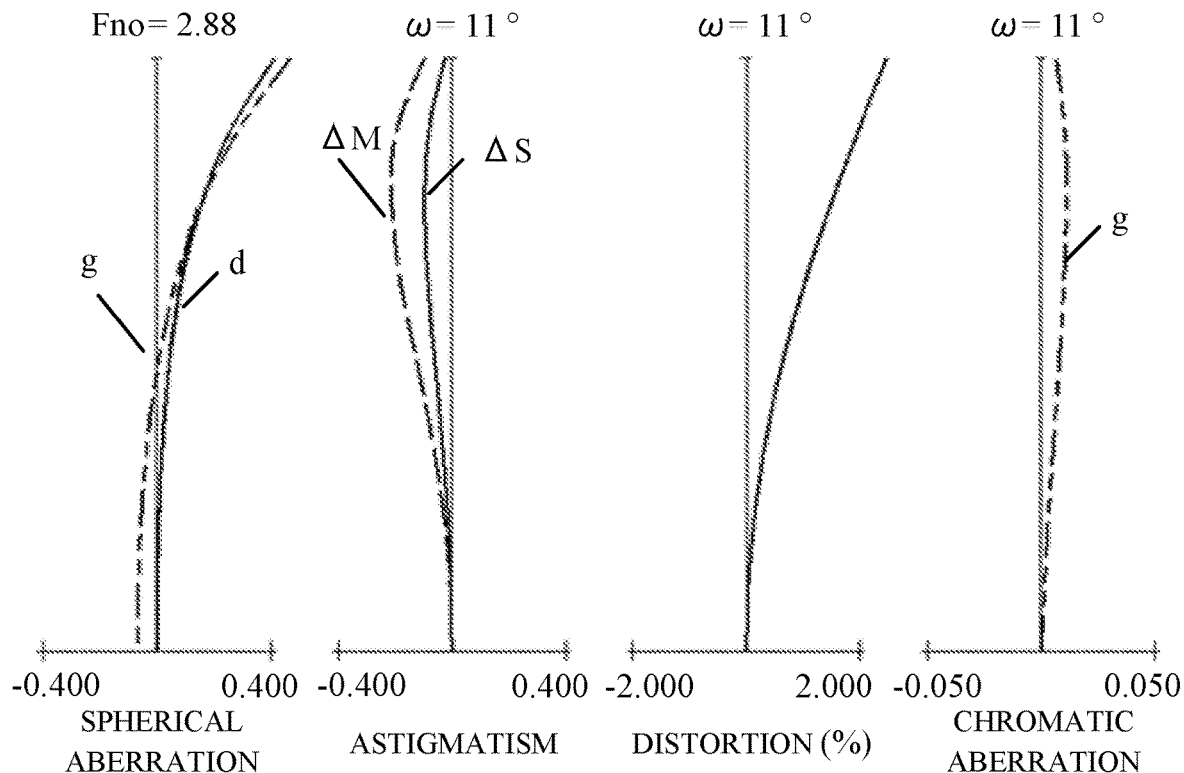
FIG. 19 is an aberration diagram of the image-capturing lens of the fifth embodiment at the image-capturing magnification of 0.5.
Figure 20:
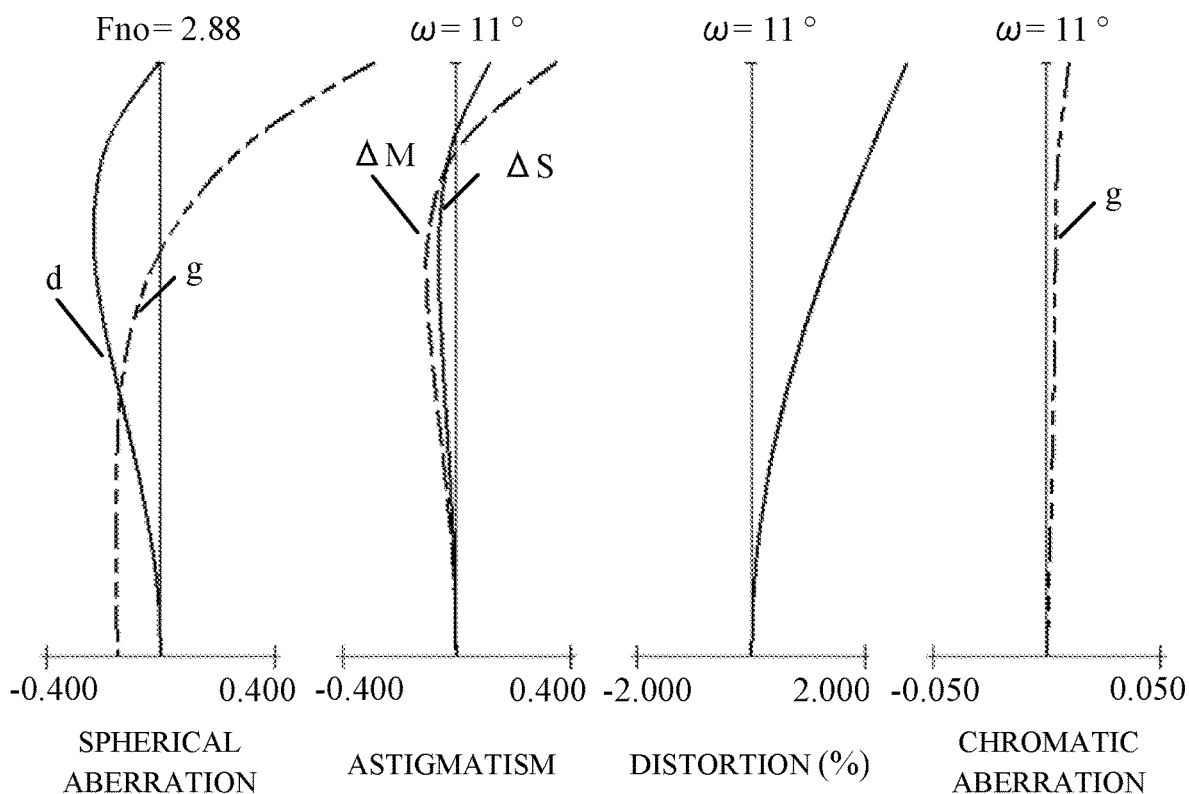
FIG. 20 is an aberration diagram of the image-capturing lens of the fifth embodiment at the image-capturing magnification of 1.5.

In the lens cross-sectional view of FIG. 13, L1 denotes the first lens unit having a positive refractive power, L2 denotes the second lens unit having a negative refractive power, L3 denotes the third lens unit having a positive refractive power, and L4 denotes the fourth lens unit having a negative refractive power, L5 denotes the fifth lens unit having a positive refractive power, and L6 denotes a sixth lens unit having a negative refractive power. SP denotes an aperture stop, which is disposed on the object side of the third lens unit L3, and is fixed during focusing. The second lens unit L2, the fourth lens unit L4, and the fifth lens unit L5 correspond to focus lens units LF that moves during focusing. The lens units other than the second lens unit L2, the fourth lens unit L4, and the fifth lens unit L5 do not move during focusing.

Although, in the first to third embodiments, when the fourth lens unit L4 moves during focusing, the two lenses (negative partial unit and positive partial unit) constituting the fourth lens unit L4 move together, these two lenses (negative partial unit and positive partial unit) may move independently. Then, in the fourth embodiment and the following fifth embodiment, the two lenses of the fourth lens unit L4 in the first to third embodiments are regarded as the fourth lens unit L4 and the fifth lens unit L5, respectively.

Therefore, in the fourth embodiment, the second lens unit L2, the fourth lens unit L4, and the fifth lens unit L5 are moved to the image side as indicated by arrows in focusing from infinity to a close distance. During focusing, the first lens unit L1 is fixed, but may be operated for aberration correction.

Except for the above, the description is the same as that of the first embodiment.

Fifth Embodiment

FIGS. 17 and 18-20 are a lens cross-sectional view and aberration diagrams of the image-capturing lens of the fifth embodiment at infinity, respectively.

The other configurations such as the lens configuration of each lens unit and the independent movement of the fourth lens unit L4 and the fifth lens L5 during focusing are the same as those described in the fourth embodiment.

(Image-Capturing Apparatus)

Next, an embodiment of the image-capturing apparatus (digital camera) as an optical apparatus using the image-capturing lens of the present invention as an image-capturing optical system will be described with reference to FIG. 21.

Figure 21:
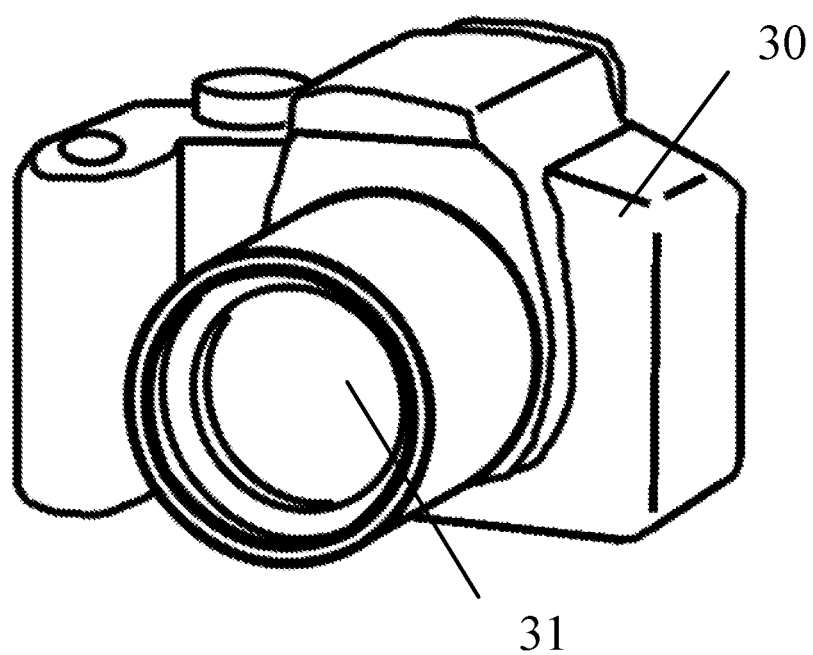
FIG. 21 is an apparatus diagram of an optical apparatus (digital camera) equipped with an image-capturing lens.

In FIG. 21, a reference numeral 30 denotes a camera body, and reference numeral 31 denotes an image-capturing optical system constituted by any of the image-capturing lenses described in the first to fifth embodiments.

A solid-state image sensor (photoelectric conversion element) such as a CCD sensor or a CMOS sensor that receives light of an object image formed by the image-capturing optical system 31 is built in the camera body 30.

Numerical Data of Each Embodiment

Next, numerical data of the image-capturing lens of each embodiment are shown in numerical examples 1 to 5. In each numerical example, ri denotes a curvature radius of the i-th surface from the object side, di denotes a surface interval between the i-th surface and the (i+1)-th surface from the object side, ni denotes a refractive index at a d-line of the i-th lens, and vi denotes an Abbe number of the i-th lens at d-line. Assuming that K is a conic constant, A4, A6, A8, A10, and A12 are fourth, sixth, eighth, tenth, and twelfth aspherical coefficients, and x is a displacement in a direction of the optical axis at a position of height h from the optical axis with reference to a surface vertex, an aspherical shape is represented as the following conditional expression:

$$x = (h^2/R)/[1+[1-(1+K)(h/R)^2]^{1/2}] - A4h^4 + A6h^6 + A8h^8 + A10h^{10} + A12h^{12}.$$

Here, R is a curvature radius and "e-X" denotes "*10$^{-x}$".

For aspherical surfaces, symbol * is added after a surface number in each numerical example.

Table 1 shows a relationship between the above-described conditional expressions and various numerical values in each numerical example.

Numerical Example 1

UNIT mm

Surface data

| Surface number | r | d | nd | vd |
|---|---|---|---|---|
| 1 | 180.313 | 6.92 | 1.67790 | 55.3 |
| 2 | −152.960 | 0.15 | | |
| 3 | 61.880 | 5.72 | 1.73400 | 51.5 |
| 4 | 206.744 | 5.29 | | |
| 5 | −146.162 | 1.80 | 1.72825 | 28.5 |
| 6 | 49.555 | 1.60 | | |
| 7 | 53.144 | 4.30 | 1.49700 | 81.5 |
| 8 | −510.338 | 0.30 | | |
| 9 | 79.830 | 5.32 | 1.53775 | 74.7 |
| 10 | −158.221 | (variable) | | |
| 11 | −135.574 | 1.40 | 1.71300 | 53.9 |
| 12 | 37.561 | 4.60 | | |
| 13 | −117.058 | 1.35 | 1.62299 | 58.2 |
| 14 | 37.639 | 3.08 | 1.78472 | 25.7 |
| 15 | 439.165 | (variable) | | |
| 16 | ∞ | 2.14 | | |
| 17(stop) | ∞ | 0.50 | | |
| 18 | 108.731 | 4.97 | 1.69350 | 50.8 |
| 19 | −69.916 | 0.50 | | |
| 20 | 100.472 | 5.44 | 1.61800 | 63.3 |
| 21 | −52.788 | 1.90 | 1.85150 | 40.8 |
| 22 | −100.215 | (variable) | | |
| 23 | −51.096 | 1.45 | 1.95375 | 32.3 |
| 24 | 89.584 | 8.50 | | |
| 25 | 94.262 | 4.52 | 1.61340 | 44.3 |
| 26 | −45.409 | (variable) | | |
| 27 | 197.018 | 5.19 | 1.71700 | 47.9 |
| 28 | −33.815 | 1.60 | 2.00100 | 29.1 |
| 29 | −309.840 | 3.00 | | |
| 30 | −69.269 | 1.50 | 1.76200 | 40.1 |
| 31 | 33.742 | 5.34 | 2.00100 | 29.1 |
| 32 | 100.172 | 10.00 | | |
| 33 | ∞ | 1.26 | 1.51633 | 64.0 |
| 34 | ∞ | 3.95 | | |
| image plane | ∞ | | | |

Various data

-continued

| UNIT mm | | | |
|---|---|---|---|
| Focal length | 102.15 | | |
| F-number | 3.24 | | |
| Half angle of view (°) | 10.79 | | |
| Total lens length | 163.30 | | |
| BF | 4.78 | | |

| Magnification | ∞ | −0.5 | −1.0 |
|---|---|---|---|
| d10 | 1.50 | 16.02 | 29.37 |
| d15 | 28.37 | 13.85 | 0.50 |
| d22 | 8.36 | 14.77 | 22.27 |
| d26 | 21.92 | 15.51 | 8.01 |

| Lens unit data | | |
|---|---|---|
| Unit | Start surface | Focal length |
| 1 | 1 | 60.09 |
| 2 | 11 | −36.39 |
| 3 | 16 | 39.06 |
| 4 | 23 | −298.36 |
| 5 | 27 | −64.51 |

Numerical Example 2

| UNIT mm | | | |
|---|---|---|---|
| Surface data | | | |
| Surface number | r | d | nd | vd |
| 1 | 159.686 | 4.40 | 1.80400 | 46.5 |
| 2 | −161.368 | 0.20 | | |
| 3 | 45.012 | 4.12 | 1.75500 | 52.3 |
| 4 | 121.651 | 2.04 | | |
| 5 | −201.515 | 1.20 | 1.89286 | 20.4 |
| 6 | 102.603 | 1.41 | | |
| 7 | 84.890 | 0.97 | 2.00100 | 29.1 |
| 8 | 28.650 | 0.52 | | |
| 9 | 29.222 | 6.49 | 1.83481 | 42.7 |
| 10 | −238.917 | (variable) | | |
| 11 | 227.730 | 1.00 | 1.95375 | 32.3 |
| 12 | 34.625 | 3.66 | | |
| 13 | −85.745 | 1.00 | 1.72000 | 46.0 |
| 14 | 33.107 | 4.37 | 1.95906 | 17.5 |
| 15 | 1872.863 | (variable) | | |
| 16(stop) | ∞ | 0.68 | | |
| 17 | 120.208 | 4.94 | 1.59522 | 67.7 |
| 18 | −50.412 | 2.74 | | |
| 19 | 54.708 | 6.46 | 1.48749 | 70.2 |
| 20 | −34.258 | 1.10 | 1.84666 | 23.8 |
| 21 | −68.301 | (variable) | | |
| 22 | −48.064 | 1.10 | 1.83481 | 42.7 |
| 23 | 58.225 | 12.73 | | |
| 24 | 183.255 | 6.51 | 1.60342 | 38.0 |
| 25 | −36.485 | (variable) | | |
| 26 | −63.376 | 1.50 | 1.95906 | 17.5 |
| 27 | −524.534 | 0.54 | | |
| 28 | −181.278 | 2.00 | 2.00100 | 29.1 |
| 29 | −1831.006 | 11.10 | | |
| image plane | ∞ | | | |

| Various data | |
|---|---|
| Focal length | 99.30 |
| F-number | 2.92 |
| Half angle of view (°) | 12.29 |
| Total lens length | 160.02 |
| BF | 11.10 |

| Magnification | ∞ | −0.5 | −1.0 |
|---|---|---|---|
| d10 | 1.54 | 9.97 | 29.65 |
| d15 | 30.14 | 21.71 | 2.03 |
| d22 | 1.94 | 14.65 | 43.96 |
| d26 | 43.62 | 30.91 | 1.60 |

| Lens unit data | | |
|---|---|---|
| Unit | Start surface | Focal length |
| 1 | 1 | 59.01 |
| 2 | 11 | −39.96 |
| 3 | 16 | 37.86 |
| 4 | 22 | −512.58 |
| 5 | 26 | −54.52 |

Numerical Example 3

| UNIT mm | | | |
|---|---|---|---|
| Surface data | | | |
| Surface number | r | d | nd | vd |
| 1 | 143.802 | 5.39 | 1.69680 | 55.5 |
| 2 | −120.679 | 0.20 | | |
| 3 | 56.196 | 3.79 | 1.72916 | 54.7 |
| 4 | 314.257 | 1.38 | | |
| 5 | −255.844 | 1.20 | 1.92286 | 18.9 |
| 6 | 220.010 | 1.00 | | |
| 7 | 57.172 | 1.20 | 1.95375 | 32.3 |
| 8 | 31.056 | 1.81 | | |
| 9 | 31.982 | 5.32 | 1.59522 | 67.7 |
| 10 | −268.045 | (variable) | | |
| 11 | −103.641 | 0.90 | 1.80400 | 46.5 |
| 12 | 32.033 | 5.37 | | |
| 13 | −85.685 | 0.90 | 1.51823 | 58.9 |
| 14 | 38.727 | 3.20 | 1.95906 | 17.5 |
| 15 | 225.083 | (variable) | | |
| 16(stop) | ∞ | 1.30 | | |
| 17 | 124.193 | 5.74 | 1.59522 | 67.7 |
| 18 | −47.911 | 0.20 | | |
| 19 | 55.941 | 7.80 | 1.59522 | 67.7 |
| 20 | −35.160 | 0.94 | 1.84666 | 23.8 |
| 21 | −89.240 | (variable) | | |
| 22 | −52.630 | 0.99 | 1.83481 | 42.7 |
| 23 | 45.601 | 12.37 | | |
| 24 | 106.338 | 6.96 | 1.59270 | 35.3 |
| 25 | −36.345 | (variable) | | |
| 26 | −32.727 | 3.51 | 1.59270 | 35.3 |
| 27 | −23.215 | 1.21 | 2.00069 | 25.5 |
| 28 | −82.446 | 3.17 | | |
| 29 | −32.333 | 1.50 | 1.67300 | 38.1 |
| 30 | −42.156 | 0.20 | | |
| 31 | −49.146 | 4.74 | 1.85150 | 40.8 |
| 32 | −29.414 | 14.00 | | |
| image plane | ∞ | | | |

| Various data | |
|---|---|
| Focal length | 99.75 |
| F-number | 2.92 |
| Half angle of view (°) | 12.24 |
| Total lens length | 168.47 |
| BF | 14.00 |

| Magnification | ∞ | −0.5 | −1.0 |
|---|---|---|---|
| d10 | 1.74 | 17.88 | 33.37 |

-continued

| UNIT mm | | | |
|---|---|---|---|
| d15 | 33.53 | 17.40 | 1.89 |
| d22 | 3.46 | 20.67 | 35.74 |
| d26 | 33.46 | 16.25 | 1.20 |

Lens unit data

| Unit | Start surface | Focal length |
|---|---|---|
| 1 | 1 | 49.90 |
| 2 | 11 | −31.55 |
| 3 | 16 | 34.14 |
| 4 | 22 | −921.94 |
| 5 | 26 | −91.30 |

Numerical Example 4

| UNIT mm | | | |
|---|---|---|---|

Surface data

| Surface number | r | d | nd | vd |
|---|---|---|---|---|
| 1 | 169.301 | 6.92 | 1.67790 | 55.3 |
| 2 | −140.449 | 0.15 | | |
| 3 | 60.069 | 3.90 | 1.73400 | 51.5 |
| 4 | 179.181 | 5.61 | | |
| 5 | −123.023 | 1.80 | 1.72825 | 28.5 |
| 6 | 47.910 | 1.60 | | |
| 7 | 48.252 | 4.73 | 1.49700 | 81.5 |
| 8 | −245.435 | 0.30 | | |
| 9 | 106.865 | 3.24 | 1.53775 | 74.7 |
| 10 | −160.965 | (variable) | | |
| 11 | −138.673 | 1.40 | 1.71300 | 53.9 |
| 12 | 38.647 | 4.60 | | |
| 13 | −108.055 | 1.35 | 1.62299 | 58.2 |
| 14 | 38.261 | 3.87 | 1.78472 | 25.7 |
| 15 | 1725.722 | (variable) | | |
| 16 | ∞ | 2.14 | | |
| 17(stop) | ∞ | 0.50 | | |
| 18 | 101.450 | 4.54 | 1.69350 | 50.8 |
| 19 | −74.783 | 0.50 | | |
| 20 | 113.453 | 5.08 | 1.61800 | 63.3 |
| 21 | −45.503 | 1.90 | 1.85150 | 40.8 |
| 22 | −87.568 | (variable) | | |
| 23 | −54.351 | 1.45 | 1.95375 | 32.3 |
| 24 | 112.373 | (variable) | | |
| 25 | 118.615 | 4.17 | 1.61340 | 44.3 |
| 26 | −48.941 | (variable) | | |
| 27 | 265.014 | 5.14 | 1.71700 | 47.9 |
| 28 | −33.444 | 1.60 | 2.00100 | 29.1 |
| 29 | −309.840 | 3.00 | | |
| 30 | −59.951 | 1.50 | 1.76200 | 40.1 |
| 31 | 34.818 | 4.21 | 2.00100 | 29.1 |
| 32 | 121.900 | 10.00 | | |
| 33 | ∞ | 1.26 | 1.51633 | 64.0 |
| 34 | ∞ | 4.43 | | |
| image plane | ∞ | | | |

Various data

| Focal length | | 100.56 | |
|---|---|---|---|
| F-number | | 2.88 | |
| Half angle of view (°) | | 10.96 | |
| Total lens length | | 161.85 | |
| BF | | 15.26 | |

| Magnification | ∞ | −0.5 | −1.0 |
|---|---|---|---|
| d10 | 1.50 | 15.43 | 29.50 |
| d15 | 28.50 | 14.57 | 0.50 |
| d22 | 8.27 | 13.94 | 22.74 |

-continued

| UNIT mm | | | |
|---|---|---|---|
| d24 | 10.01 | 5.07 | 2.50 |
| d26 | 23.10 | 22.37 | 16.15 |

Lens unit data

| Unit | Start surface | Focal length |
|---|---|---|
| 1 | 1 | 61.96 |
| 2 | 11 | −38.73 |
| 3 | 16 | 39.62 |
| 4 | 23 | −38.25 |
| 5 | 25 | 57.02 |
| 6 | 27 | −59.62 |

Numerical Example 5

| UNIT mm | | | |
|---|---|---|---|

Surface data

| Surface number | r | d | nd | vd |
|---|---|---|---|---|
| 1 | 135.888 | 6.84 | 1.72369 | 53.0 |
| 2 | −115.562 | 0.15 | | |
| 3 | 61.428 | 3.38 | 1.75473 | 50.2 |
| 4 | 187.686 | 2.63 | | |
| 5 | −135.294 | 1.80 | 1.76718 | 26.7 |
| 6 | 49.929 | 1.60 | | |
| 7 | 50.070 | 4.92 | 1.49700 | 81.5 |
| 8 | −192.389 | 0.30 | | |
| 9 | 82.266 | 3.38 | 1.53775 | 74.7 |
| 10 | −287.607 | (variable) | | |
| 11 | −113.832 | 1.40 | 1.70918 | 54.4 |
| 12 | 34.188 | 4.60 | | |
| 13 | −103.700 | 1.35 | 1.66449 | 55.4 |
| 14 | 34.735 | 4.00 | 1.81005 | 22.8 |
| 15 | 458.768 | (variable) | | |
| 16 | ∞ | 2.14 | | |
| 17(stop) | ∞ | 0.50 | | |
| 18 | 96.696 | 4.58 | 1.73793 | 51.7 |
| 19 | −81.642 | 0.50 | | |
| 20 | 99.748 | 6.46 | 1.61800 | 63.3 |
| 21 | −43.552 | 1.90 | 1.77125 | 29.0 |
| 22 | −93.348 | (variable) | | |
| 23 | −51.925 | 1.45 | 1.95200 | 33.1 |
| 24 | 76.545 | (variable) | | |
| 25 | 138.178 | 4.84 | 1.66343 | 33.5 |
| 26 | −42.688 | (variable) | | |
| 27 | 304.844 | 5.40 | 1.51702 | 56.5 |
| 28 | −30.611 | 1.60 | 2.00100 | 29.1 |
| 29 | −159.422 | 3.00 | | |
| 30 | −69.902 | 1.50 | 1.73865 | 28.7 |
| 31 | 33.510 | 5.89 | 2.00100 | 29.1 |
| 32 | 264.920 | 10.00 | | |
| 33 | ∞ | 1.26 | 1.51633 | 64.0 |
| 34 | ∞ | 4.95 | | |
| image plane | ∞ | | | |

Various data

| Focal length | | 100.00 | |
|---|---|---|---|
| F-number | | 2.88 | |
| Half angle of view (°) | | 11.02 | |
| Total lens length | | 166.36 | |
| BF | | 15.78 | |

| Magnification | ∞ | −0.5 | −1.0 |
|---|---|---|---|
| d10 | 1.50 | 10.62 | 30.39 |
| d15 | 29.40 | 20.27 | 0.50 |
| d22 | 8.15 | 14.61 | 35.29 |

-continued

UNIT mm

| d24 | 9.20 | 4.62 | 2.50 |
|-----|------|------|------|
| d26 | 26.23 | 24.36 | 5.80 |

Lens unit data

| Unit | Start surface | Focal length |
|------|---------------|--------------|
| 1 | 1 | 52.59 |
| 2 | 11 | −31.62 |
| 3 | 16 | 37.71 |
| 4 | 23 | −32.32 |
| 5 | 25 | 49.69 |
| 6 | 27 | −69.16 |

TABLE 1

|  | Numerical Example 1 | Numerical Example 2 | Numerical Example 3 |
|---|---|---|---|
| D4np/D4 | 0.59 | 0.63 | 0.61 |
| L2/L4 | 2.00 | 0.67 | 0.98 |
| f4/fR | 4.62 | 9.40 | 10.10 |
| f4/f1 | −4.97 | −8.69 | −18.48 |
| f4/f2 | 8.20 | 12.83 | 29.23 |

|  | Numerical Example 4 | Numerical Example 5 |
|---|---|---|
| D4np/D45 | 0.64 | 0.59 |
| L4/L5 | 1.93 | 2.87 |
| L2/L4 | 1.94 | 1.07 |
| f45/fR | 5.70 | 4.24 |
| f45/f1 | −5.48 | −5.57 |
| f45/f2 | 8.77 | 9.27 |

According to the above embodiments, a high-performance optical system in which enlargement in the image-capturing magnification is achieved while being compact, and an optical apparatus having the same are provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-113311, filed on Jun. 19, 2019 which is hereby incorporated by reference herein in its entirety.

What is claimed is:

1. An optical system comprising, in order from an object side to an image side:
   a first lens unit having a positive refractive power;
   a second lens unit having a negative refractive power;
   a third lens unit having a positive refractive power; and
   a fourth lens unit having a negative refractive power,
   wherein distances between adjacent lens units change during focusing,
   wherein at least the second lens unit and the fourth lens unit move during focusing,
   wherein the fourth lens unit consists of a negative partial unit having a negative refractive power and a positive partial unit having a positive refractive power,
   wherein an air distance between the negative partial unit and the positive partial unit is the largest among air distances between adjacent lenses in the fourth lens unit, and
   wherein the following conditional expression is satisfied $0.45 < D4np/D4 < 0.95$ $-25.0 < f4/f1 < -3.0$ where D4 is a distance on an optical axis from a lens surface closest to the object side to a lens surface closest to the image side in the fourth lens unit, D4np is the air distance between the negative partial unit and the positive partial unit in the fourth lens unit, and f4 and f1 are focal lengths of the fourth lens unit and the first lens unit, respectively.

2. The optical system according to claim 1, wherein the following conditional expression is satisfied $0.5 < L2/L4 < 2.5$ where L2 and L4 are moving amounts of the second lens unit and the fourth lens unit from infinity to a closest object in focusing, respectively.

3. The optical system according to claim 1, further comprising:
   a rear unit having a negative refractive power as a whole provided on the image side of the fourth lens unit,
   wherein the following conditional expression is satisfied $1.0 < f4/fR < 15.0$ where f4 and fR are focal lengths of the fourth lens unit and the rear lens unit, respectively.

4. The optical system according to claim 1, wherein the following conditional expression is satisfied $6.0 < f4/f2 < 35.0$ where f4 and f2 are focal lengths of the fourth lens unit and the second lens unit, respectively.

5. The optical system according to claim 1, wherein both the second lens unit and the fourth lens unit move to the image side during focusing, and the lens units other than the second lens unit and the fourth lens unit do not move during focusing.

6. The optical system according to claim 1, wherein the optical system consists of, in order from the object side to the image side, the first lens unit, the second lens unit, the third lens unit, the fourth lens unit, and a fifth lens unit.

7. The optical system according to claim 1, wherein a whole or a part of the third lens unit moves in a direction orthogonal to an optical axis direction to correct a shift of an image plane of an object image.

8. An optical apparatus comprising:
   an optical system; and
   an image sensor configured to receive light of an image formed by the optical system,
   wherein the optical system includes, in order from an object side to an image side:
   a first lens unit having a positive refractive power;
   a second lens unit having a negative refractive power;
   a third lens unit having a positive refractive power; and
   a fourth lens unit having a negative refractive power,
   wherein distances between adjacent lens units change during focusing,
   wherein at least the second lens unit and the fourth lens unit move during focusing,
   wherein the fourth lens unit consists of a negative partial unit having a negative refractive power and a positive partial unit having a positive refractive power,
   wherein an air distance between the negative partial unit and the positive partial unit is the largest among air distances between adjacent lenses in the fourth lens unit, and wherein the following conditional expression is satisfied $$0.45 < D4np/D4 < 0.95$$

$$-25.0 < f4/f1 < -3.0$$

where D4 is a distance on an optical axis from a lens surface closest to the object side to a lens surface closest to the image side in the fourth lens unit, D4np is the air distance between the negative partial unit and the positive partial unit in the fourth lens unit, and f4 and f1 are focal lengths of the fourth lens unit and the first lens unit, respectively.

9. An optical system comprising, in order from an object side to an image side:
 a first lens unit having a positive refractive power;
 a second lens unit having a negative refractive power;
 a third lens unit having a positive refractive power; and
 a fourth lens unit having a negative refractive power,
 a rear unit having a negative refractive power as a whole,
 wherein distances between adjacent lens units change during focusing,
 wherein at least the second lens unit and the fourth lens unit move during focusing,
 wherein the fourth lens unit consists of a negative partial unit having a negative refractive power and a positive partial unit having a positive refractive power,
 wherein an air distance between the negative partial unit and the positive partial unit is the largest among air distances between adjacent lenses in the fourth lens unit, and wherein the following conditional expression is satisfied $$0.45 < D4np/D4 < 0.95$$

$$1.0 < f4/fR < 15.0$$

where D4 is a distance on an optical axis from a lens surface closest to the object side to a lens surface closest to the image side in the fourth lens unit, D4np is the air distance between the negative partial unit and the positive partial unit in the fourth lens unit, and f4 and fR are focal lengths of the fourth lens unit and the rear lens unit, respectively.

10. An optical system comprising, in order from an object side to an image side:
 a first lens unit having a positive refractive power;
 a second lens unit having a negative refractive power;
 a third lens unit having a positive refractive power; and
 a fourth lens unit having a negative refractive power,
 wherein distances between adjacent lens units change during focusing,
 wherein at least the second lens unit and the fourth lens unit move during focusing,
 wherein the fourth lens unit consists of a negative partial unit having a negative refractive power and a positive partial unit having a positive refractive power,
 wherein an air distance between the negative partial unit and the positive partial unit is the largest among air distances between adjacent lenses in the fourth lens unit, and
 wherein the following conditional expression is satisfied $$0.45 < D4np/D4 < 0.95$$

$$-6.0 < f4/f2 < 35.0$$

where D4 is a distance on an optical axis from a lens surface closest to the object side to a lens surface closest to the image side in the fourth lens unit, D4np is the air distance between the negative partial unit and the positive partial unit in the fourth lens unit, and f4 and f2 are focal lengths of the fourth lens unit and the second lens unit, respectively.

11. An optical system comprising, in order from an object side to an image side:
 a first lens unit having a positive refractive power;
 a second lens unit having a negative refractive power;
 a third lens unit having a positive refractive power;
 a fourth lens unit having a negative refractive power, and
 a fifth lens unit having a negative refractive power,
 wherein distances between adjacent lens units change during focusing,
 wherein at least the second lens unit and the fourth lens unit move during focusing,
 wherein the fourth lens unit consists of a negative partial unit having a negative refractive power and a positive partial unit having a positive refractive power,
 wherein an air distance between the negative partial unit and the positive partial unit is the largest among air distances between adjacent lenses in the fourth lens unit, and
 wherein the following conditional expression is satisfied $$0.45 < D4np/D4 < 0.95$$

where D4 is a distance on an optical axis from a lens surface closest to the object side to a lens surface closest to the image side in the fourth lens unit, and D4np is the air distance between the negative partial unit and the positive partial unit in the fourth lens unit.

* * * * *